US011006187B2

(12) United States Patent
Ryu

(10) Patent No.: US 11,006,187 B2
(45) Date of Patent: May 11, 2021

(54) METHOD AND APPARATUS FOR EXECUTING APPLICATION IN WIRELESS COMMUNICATION SYSTEM

(71) Applicant: Samsung Electronics Co., Ltd., Suwon-si (KR)

(72) Inventor: Young-Sun Ryu, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/023,923

(22) PCT Filed: Sep. 23, 2014

(86) PCT No.: PCT/KR2014/008812
§ 371 (c)(1),
(2) Date: Mar. 22, 2016

(87) PCT Pub. No.: WO2015/041494
PCT Pub. Date: Mar. 26, 2015

(65) Prior Publication Data
US 2016/0249114 A1 Aug. 25, 2016

(30) Foreign Application Priority Data

Sep. 23, 2013 (KR) .................. 10-2013-0112842
May 26, 2014 (KR) .................. 10-2014-0063216

(51) Int. Cl.
H04N 21/6543 (2011.01)
H04N 21/4363 (2011.01)
(Continued)

(52) U.S. Cl.
CPC ......... H04N 21/6543 (2013.01); H04L 67/16 (2013.01); H04N 21/4126 (2013.01); H04N 21/43615 (2013.01); H04N 21/43637 (2013.01); H04N 21/4431 (2013.01); H04N 21/4433 (2013.01); H04N 21/44227 (2013.01);
(Continued)

(58) Field of Classification Search
CPC ........... H04N 21/6332; H04N 21/6377; H04N 21/6543; H04N 21/6587
See application file for complete search history.

(56) References Cited

U.S. PATENT DOCUMENTS

2007/0143357 A1* 6/2007 Chaudhri .......... G06F 17/30017
2007/0250458 A1 10/2007 Watanabe et al.
(Continued)

FOREIGN PATENT DOCUMENTS

CN 102158664 A 8/2011
JP 2010-160748 A 7/2010
(Continued)

OTHER PUBLICATIONS

Netflix, Dial and Launch Protocol Specification, Dec. 19, 2012, Version 1.6.4, XP055372033.
(Continued)

Primary Examiner — Jeremy S Duffield
(74) Attorney, Agent, or Firm — Jefferson IP Law, LLP

(57) ABSTRACT

A first device in a wireless communication system is provided. The first device discovers a second device using a first application, and transmits to the second device information to request launch of a second application by the second device.

4 Claims, 15 Drawing Sheets

(51) Int. Cl.
*H04N 21/442* (2011.01)
*H04N 21/443* (2011.01)
*H04L 29/08* (2006.01)
*H04N 21/6377* (2011.01)
*H04N 21/6332* (2011.01)
*H04N 21/6587* (2011.01)
*H04N 21/41* (2011.01)
*H04N 21/436* (2011.01)
*H04N 21/81* (2011.01)
*H04N 21/858* (2011.01)
*H04L 29/06* (2006.01)

(52) U.S. Cl.
CPC ..... *H04N 21/6332* (2013.01); *H04N 21/6377* (2013.01); *H04N 21/6587* (2013.01); *H04N 21/8173* (2013.01); *H04N 21/8186* (2013.01); *H04N 21/8586* (2013.01); *H04L 69/24* (2013.01)

(56) References Cited

U.S. PATENT DOCUMENTS

| | | | |
|---|---|---|---|
| 2008/0201757 A1* | 8/2008 | Lee | H04N 21/43615 725/131 |
| 2009/0111453 A1 | 4/2009 | Hsu et al. | |
| 2011/0016171 A1* | 1/2011 | Kim | H04N 21/4586 709/203 |
| 2011/0145581 A1 | 6/2011 | Malhotra et al. | |
| 2011/0167468 A1* | 7/2011 | Lee | H04N 5/44 725/132 |
| 2012/0227076 A1 | 9/2012 | Mccoy et al. | |
| 2012/0331513 A1* | 12/2012 | Yamagishi | H04N 21/2362 725/95 |
| 2013/0047174 A1 | 2/2013 | Lee et al. | |
| 2013/0238702 A1 | 9/2013 | Sheth et al. | |
| 2013/0246905 A1 | 9/2013 | Isozaki | |
| 2014/0006474 A1* | 1/2014 | White | H04N 21/4126 709/201 |
| 2014/0075003 A1 | 3/2014 | Tanaka et al. | |
| 2014/0150022 A1* | 5/2014 | Oh | H04N 21/478 725/37 |
| 2014/0214967 A1* | 7/2014 | Baba | H04H 20/08 709/205 |
| 2014/0280756 A1* | 9/2014 | Maity | H04L 67/06 709/219 |
| 2015/0089222 A1* | 3/2015 | White | H04N 21/43615 713/168 |
| 2016/0337449 A1* | 11/2016 | Yang | H04N 21/4126 |

FOREIGN PATENT DOCUMENTS

| | | |
|---|---|---|
| JP | 2013-066160 A | 4/2013 |
| KR | 10-2011-0010052 A | 1/2011 |
| KR | 10-2011-0051791 A | 5/2011 |
| KR | 10-2011-0112645 A | 10/2011 |
| KR | 10-2012-0112296 A | 10/2012 |
| KR | 10-2013-0020405 A | 2/2013 |
| KR | 10-2014-0001798 A | 1/2014 |
| WO | 2005/066808 A1 | 7/2005 |
| WO | 2013/061517 A1 | 5/2013 |

OTHER PUBLICATIONS

Lee et al., The u-MUSE System: An Integrated UPnP AV Home Entertainment System Supporting RUI Service and Device Mobility, International Conference Hybrid Information Technology, Nov. 9, 2006, pp. 712-717, XP032070246, Piscataway, New Jersey, USA.
DVB Organization, Digital Video Broadcasting (DVB); Companion Screens and Supplementary Streams Report: Current Experiences and Relevant Technologies, Technical Report, Jun. 5, 2013, V<0.0.2>, XP017840977.
Samsung, AllShare Framework: Developer's Guide Programming Guide, AllShare Framework, Jun. 18, 2013, Version 2.0, XP55370829.
Samsung, AllShare Framework, Samsung Developers, Jun. 27, 2013, XP55370827.
Chinese Office Action dated Aug. 1, 2017, which issued in the Chinese Application No. 201480052311.0.
Japanese Office Action dated Aug. 7, 2018, issued in the Japanese Application No. 2016-516562.
A Decision of Grant dated Jun. 11, 2019, issued in a counterpart Japanese application No. 2016-516562.
Kurokawa et al.; 3GPP (3rd Generation Partnership Program); Collaborative Seamless Communication Services in Multi-Device and Multi-Network Environment; ETSI (European Telecommunications Standards Institute); Apr. 1, 2012.
European Office Action dated Mar. 26, 2020, issued in a counterpart European Application No. 14 846 282.3-1213.
UPNP Device Architecture 1.1,XP 002562314, Jan. 8, 2010.
Korean Office Action dated Jul. 8, 2020, issued in a counterpart Korean Application No. 10-2014-0063216.
Chinese Office Action dated Nov. 3, 2020, issued in a counterpart Chinese Application No. 201480052311.0.
Canadian Office Action dated Oct. 14, 2020, issued in a counterpart Canadian Application No. 2,925,284.
Netflix Dial Discovery and Launch Protocol Specificaitonversion, Dec. 31, 2012.
UPNP Device Architecture, Aug. 24, 2009.
Korean Decision on Grant dated Dec. 3, 2020, issued in a counterpart Korean Application No. 10-2014-0063216.

* cited by examiner

METHOD AND APPARATUS FOR EXECUTING APPLICATION IN WIRELESS COMMUNICATION SYSTEM

CROSS-REFERENCE TO RELATED APPLICATION(S)

This application is a U.S. National Stage application under 35 U.S.C. § 371 of an International application filed on Sep. 23, 2014 and assigned application number PCT/KR2014/008812, which claimed the benefit of a Korean patent application filed on May 26, 2014 in the Korean Intellectual Property Office and assigned Serial number 10-2014-0063216 and of a Korean patent application filed on Sep. 23, 2013 in the Korean Intellectual Property Office and assigned Serial number 10-2013-0112842, the entire disclosure of each of which is hereby incorporated by reference.

TECHNICAL FIELD

The present disclosure relates to a method and apparatus for launching an application in a wireless communication system.

BACKGROUND

With rapid advances in network technologies and multimedia technologies, various types of devices have been developed and convergence between those devices has been accelerated. In line with this, various devices such as digital televisions (TVs), home theaters, computer devices, mobile terminals, and the like often transmit and receive data and provide converged services in a network environment. To provide the converged services, there is an increasing need for a structure for controlling mutual operations between devices or a structure for performing operations that are mutually related between the devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for launching an application in a wireless communication system.

Another aspect of the present disclosure is to provide a method and apparatus for transmitting and receiving application information between devices in a wireless communication system.

Another aspect of the present disclosure is to provide a method and apparatus for using multi-screens based on multiple devices.

Another aspect of the present disclosure is to provide a method and apparatus for cooperatively using applications between multiple devices in a network environment where the multiple devices are connected.

Another aspect of the present disclosure is to provide a method and apparatus for performing a control operation between devices based on an application cooperating operation.

In accordance with an aspect of the present disclosure, a method for launching an application by a first device in a wireless communication system is provided. The method includes discovering a second device using a first application, and transmitting to the second device information to request launch of a second application by the second device In accordance with another aspect of the present disclosure, a method for launching an application by a first device in a wireless communication system is provided. The method includes receiving from a second device information to request launch of a first application, and launching the first application based on the information.

In accordance with another aspect of the present disclosure, a first device in a wireless communication system is provided. The first device includes an application unit configured to discover a second device using a first application, and transmit to the second device information to request launch of a second application by the second device.

In accordance with another aspect of the present disclosure, a first device in a wireless communication system is provided. The first device includes a manager configured to receive from a second device information to request launch of a first application; and an application unit configured to launch the first application based on the information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
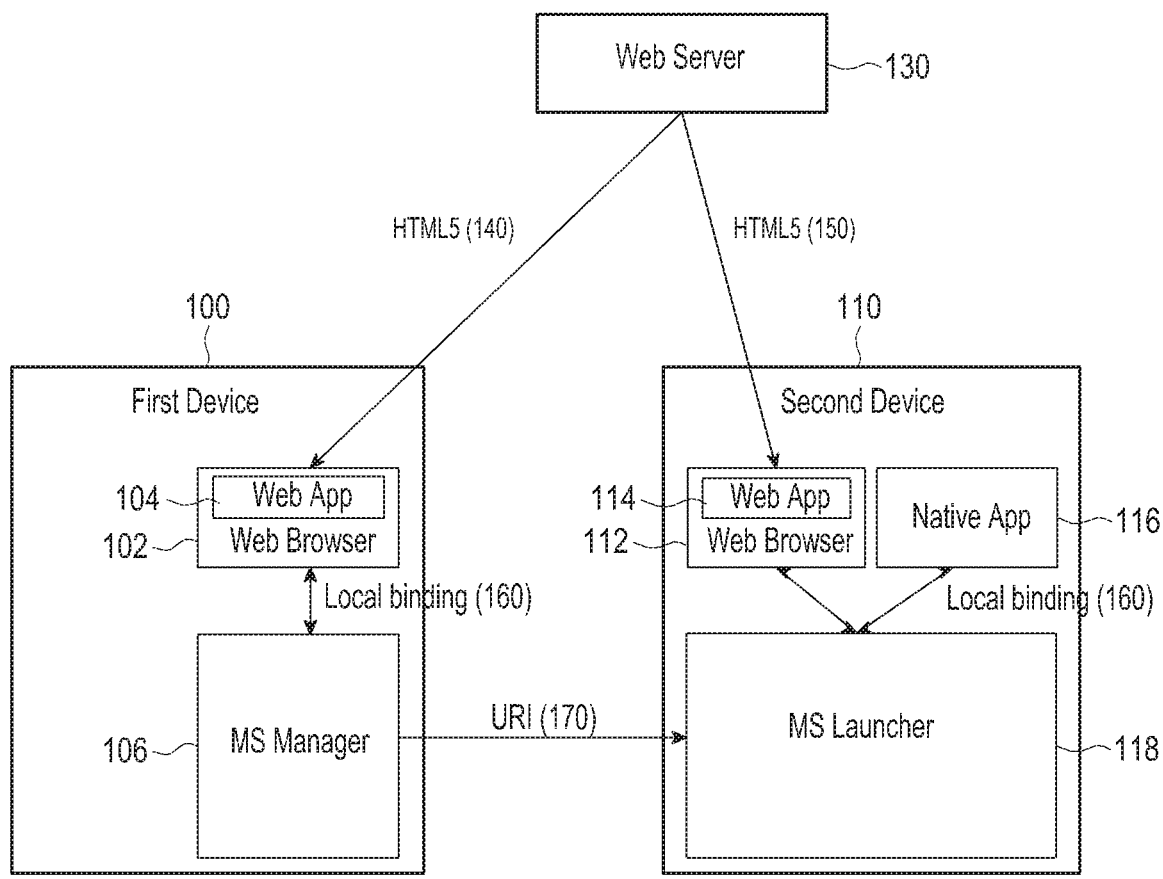
FIG. 1 illustrates a schematic structure of a wireless communication system according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various embodiments of the present disclosure, and similarly, a second element may be named as a first element.

It should be understood that the term "include" or "has" used in the various embodiments of the present disclosure is to indicate the presence of features, numbers, operations, elements, parts, or a combination thereof described in the specifications, and does not preclude the presence or addition of one or more other features, numbers, operations, elements, parts, or a combination thereof.

Terms defined in the present disclosure are used for only describing a specific embodiment and may not have an intention to limit the scope of other embodiments. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined.

According to various embodiments of the present disclosure, a device may have a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, mobile medical equipment, a camera, and a wearable device (e.g., a head-mounted device (HMD)), electronic clothing, electronic bracelets, electronic necklaces, electronic appcessory, electronic tattoos, smart watches, and the like.

According to various embodiments of the present disclosure, the device may be a smart home appliance having a communication function. The smart home appliance may include, for example, at least one of a television (TV), a digital video disc (DVD) player, audio equipment, a refrigerator, an air conditioner, a vacuum cleaner, an oven, a microwave oven, a washing machine, an air cleaner, a set-top box (STB), a TV box (e.g., Samsung HomeSync™, Apple TV™, or Google TV™), a game console, an electronic dictionary, a camcorder, and an electronic picture frame.

According to another embodiment of the present disclosure, the electronic device may include medical equipment (e.g., a magnetic resonance angiography (MRA) device, magnetic resonance imaging (MRI), a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system for ships, a gyroscope, or a compass for ships), avionics, a security device, an industrial robot or a home robot, and the like.

According to various embodiments of the present disclosure, the device may include a piece of furniture, a part of building/structure, an electronic board, an electronic signature receiving device, a projector, and various measuring instruments (e.g., a water, electricity, gas, or electric wave measuring device), which have a communication function.

According to various embodiments of the present disclosure, the device may be a combination of the above-described devices. It will be obvious to those of ordinary skill in the art that the electronic device according to various embodiments of the present disclosure is not limited to the above-listed devices.

According to various embodiments of the present disclosure, the device may be, for example, an electronic device.

In an embodiment of the present disclosure, a method and apparatus for launching an application in a wireless communication system is provided. The wireless communication system may be a wireless communication system in a network environment (e.g., a home network environment and the like) where multiple devices are connected. In the wireless communication system, a first device and a second device cooperate or interwork with each other such that the second device provides information about an application of the first device, which is associated with an application of the second device, to the first device. More specifically, the second device discovers the first device with which the second device may cooperate based on a web technology, and transmits information about the application of the first device, which is associated with the application of the second device, to the first device, to launch the application of the first device.

It may be advantageous to set forth definitions of certain words and phrases used throughout this patent document, the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, and the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

In an embodiment of the present disclosure, in a network environment where multiple devices are connected, with a discovery operation and an application information transmission/reception operation between devices based on a web technology, a second device may launch an application of a first device or the first device may launch an application of the second device. For example, if the first device is a digital television (DTV) and the second device is a mobile terminal, the second device may launch an application associated with broadcasting of the first device by using the application (an electronic program guide (EPG) and the like) of the second device.

Moreover, in an embodiment of the present disclosure, the use of a multiscreen (MS) may be supported such that the first device may display main information (a broadcasting program or broadcasting information) and the second device may display additional information (broadcasting additional information).

Furthermore, in an embodiment of the present disclosure, the second device may perform a control operation (volume setting and channel change) with respect to the first device by using an application (a remote controller) of the second device. In a conventional hybrid broadcasting environment of the related art, information about an application associated with broadcasting has to be obtained in the first device over a broadcasting network, whereas, in an embodiment of the present disclosure, application information of the first device may be obtained in the second device.

In an embodiment of the present disclosure, a detailed protocol necessary for cooperation between the second device and the first device is provided, together with a system configuration method necessary for cooperation between multiple devices in the same network. In an embodiment of the present disclosure, by providing a common framework for application cooperation between multiple devices, the common framework may be used for a remote user interface (RUI) or may be used in various broadcasting standards environments.

Meanwhile, in an embodiment of the present disclosure, an application may include a web application generated in hypertext markup language 5 (HTML5) and a native application dependent on an operating system (OS) of a device. For convenience, an application will be referred to as "App".

An embodiment of the present disclosure will be described in detail. An embodiment of the present disclosure may provide the following methods:

configuring a wireless communication system for cooperation between the second device and the first device;
a method for discovering the first device by the second device;
a method for discovering the second device by the first device;
a method for launching a particular App of the first device by the second device;
a method for selecting an App suitable for capabilities of the first device by the second device; and
a method for providing service end-point information for providing a service by the first device.

First Embodiment

FIG. 1 illustrates a schematic structure of a wireless communication system according to a first embodiment of the present disclosure.

Referring to FIG. 1, the wireless communication system may include a web server 130 and multiple devices. The multiple devices communicate in the same network, and may be, for example, devices capable of wireless communication in a home network. In FIG. 1, among the multiple devices, a first device 100 and a second device 110 which are capable of cooperating or interworking with each other will be described.

The web server 130 provides web Apps 104 and 114 that may be used in the first device 100 and the second device 110. The web Apps 104 and 114 may include an HTML, a cascading style sheet (CSS), JavaScript, video, images, and the like. The web server 130 may exist in a local network or an external network (cloud).

The first device 100 indicates a main device in which an App is launched. For example, the first device 100 may be a common device such as a digital TV (DTV) or a STB, and the App may be an App associated with broadcasting.

The second device 110 indicates an auxiliary device that launches an App by cooperating with the first device 100. The second device 110 may be a personal terminal such as a mobile terminal or a tablet PC.

The first device 100 and the second device 110 may include web browsers 102 and 112, respectively. The web browsers 102 and 112 are used to launch web Apps 104 and 114 made using HTML5 140 and 150 and related web technologies.

The second device 110 may include a native App 116. The native App 116 indicates an App launched in a platform OS (e.g., Android, iOS, Windows, Tizen, and the like) of the second device 110. The native App 116 may be compiled into binary code and launched.

A multiscreen (MS) manager 106 included in the first device 100 performs operations needed for cooperation with the second device 110 via a uniform resource identifier (URI) 170. That is, the MS manager 106 discovers the second device 110 in a network and transmits App launch information to an MS launcher 118 of the second device 110.

The MS manager 106 performs a function of delivering App information to the second device 110, a function of requesting launch of an App from the second device 110, and a function of enabling inter-App communication between the first device 100 and the second device 110.

The MS launcher 118 included in the second device 110 performs operations needed for cooperation with the first device 100. That is, the MS launcher 118 communicates with the MS manager 106 and launches the App of the second device 110. The MS launcher 118 performs functions of discovering the first device 100 in the network, a function of requesting launch of the App from the first device 100, and a function of enabling inter-App communication between the second device 110 and the first device 100.

It will be understood by those of ordinary skill in the art that web browser 102 and the MS manager 106 have a local binding 160 therebetween, and the web browser 112 and native App 116 are locally bound 160 to the MS launcher 118.

Figure 2:
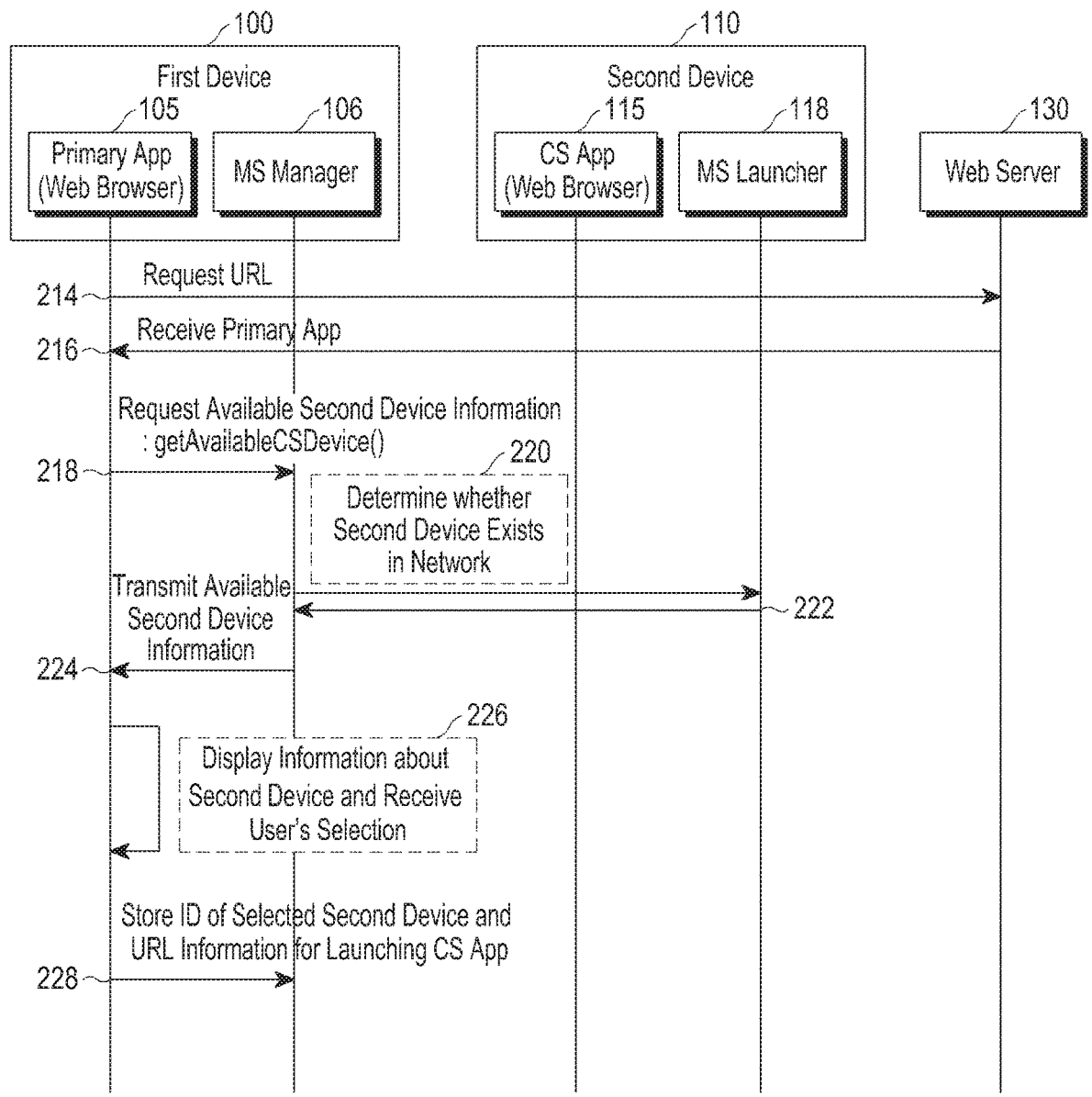
FIG. 2 is a signal flow illustrating a process of discovering a second device and being paired with the second device by a first device according to a first embodiment of the present disclosure.

FIG. 2 is a signal flow illustrating a process of discovering a second device and being paired with the second device by a first device according to a first embodiment of the present disclosure.

Referring to FIG. 2, the first device 100 sends a uniform resource locator (URL) request to the web server 130 through the web browser 102 in operation 214. The first device 100 receives a web page from the web server 130 in operation 216. The web browser 102 processes and displays the received web page as a primary App 105.

The primary App 105 launched by the web browser 102 sends a request for a list of available second devices 110 (a second device identifier (ID) list) to the MS manager 106 by using a pre-defined application programming interface (API) (e.g., getAvailableCSDeviceQ), to discover the second device 110, in operation 218.

The MS manager 106 sends a signal to the MS launcher 118 of the second device 110 to discover the second device 110 existing in the network in operation 220, and receives a response signal from the MS launcher 118 in operation 222. A protocol used to discover the second device 110 may be a protocol defined in a second embodiment to be described below, and will be described in detail when the second embodiment is described. The MS manager 106 determines that the second device 110 is an available device upon receiving the response signal, and transmits information about the second device 110 to the primary App 105 in operation 224.

Although it is illustrated in FIG. 2 that there is one second device 110, multiple second devices 110 may exist in the network, and in this case, a list of the second devices 110 is generated in the MS manager 106 and is transmitted to the primary App 105.

The primary App 105 displays the information about the second device 110 to receive user's selection of whether to use the second device 110 in operation 226. For example, how to display the information about the second device 110 on a screen, how to receive selection from a user, and whether the first device 100 automatically selects the second device 110 will not be defined in detail. However, since the primary App 105 is defined as a web App, the information about the second device 110 may be processed using JavaScript and displayed on a web page for reception of selection from the user.

Once the second device 110 is selected, the primary App 105 stores an ID of the second device 110 and URL information for launching a CS App 115, which is the App of the second device 110, in operation 228. The stored information may be used later for the first device to launch the CS App 115 of the second device 110.

Figure 3:
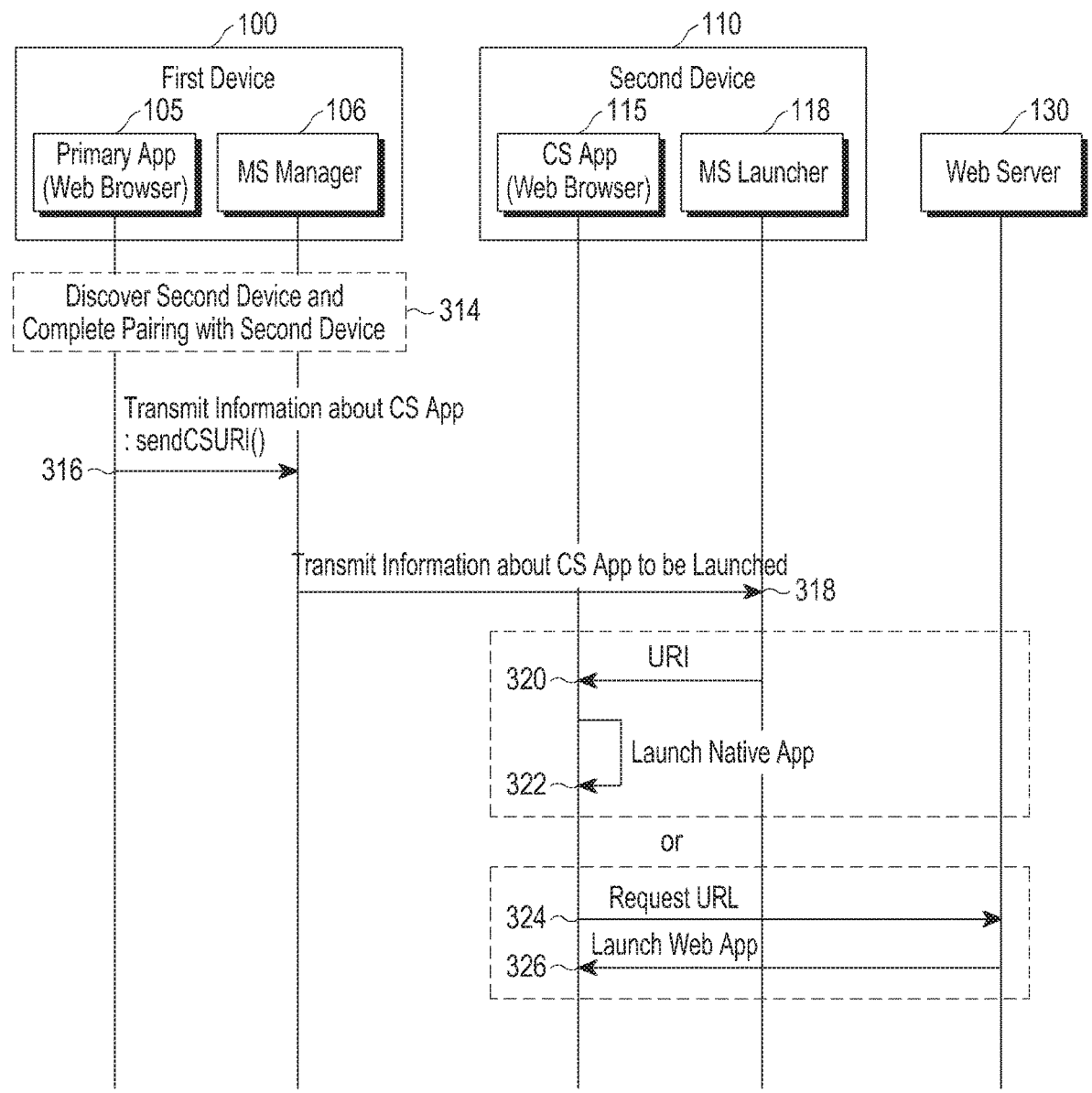
FIG. 3 is a signal flow illustrating a process of launching an App of a second device by a first device according to a first embodiment of the present disclosure.

FIG. 3 is a signal flow illustrating a process of launching the App of a second device by a first device according to a first embodiment of the present disclosure.

Referring to FIG. 3, once discovery and pairing of the second device 110 are completed through operations 214 through 228 of FIG. 2 described above in operation 314, the primary App 105 transmits information about the CS App 115 to be launched in the second device 110 to the MS manager 106 by using a particular API (e.g., sendCSURIQ) in operation 316.

The MS manager 106 delivers the information about the CS App 115 to be launched to the MS launcher 118 of the second device 110 in operation 318. The MS launcher 118 transmits uniform resource identifier (URI) information (including URL information and uniform resource name (URN) information) included in the information about the CS App 115 to be launched to the web browser 112 in operation 320.

The web browser 112 determines whether the CS App 115 to be launched is a native App or a web App based on the URI information. If the CS App 115 to be launched is a native App, the web browser 112 launches the native App in operation 322.

If the CS App 115 to be launched is a web App, the web browser 112 requests transmission of a web page by sending an URL request including the URI to the web server 130 in operation 324. Once the web page is received from the web server 130, the web browser 112 displays the corresponding web page as the CS App 115.

As such, since the CS App 115 is launched by the primary App 105 of the first device 100 in operation 326, the primary App 105 and the CS App 115 may operate in cooperation with each other.

Table 1 briefly shows APIs that are available in the first device 100, as executed in operation 218 of FIG. 2 and operation 316 of FIG. 3.

TABLE 1

| API | Description | Input Factor | Output Factor |
| --- | --- | --- | --- |
| getAvailableCSDevice(void) | Get a list of second devices available in a network | None | Success: Device list<br>Failure: Null |
| sendSURI(unit target_device, char*URI) | Send URI information of an App to a second device | unit target_device: An ID of a target second device<br>char* URI: Location information of a CS App to be launched | Success: True<br>Failure: False |

Referring to Table 1, getAvailableCSDevice( ) has no input factor and is used to obtain a list of second devices available in a network. sendCSURI( ) has two input factors: unit target_device indicating an ID of a second device which is an App launch target and URI information of the App of the second device to be launched, and may be used to launch the App of the second device.

Figure 4:
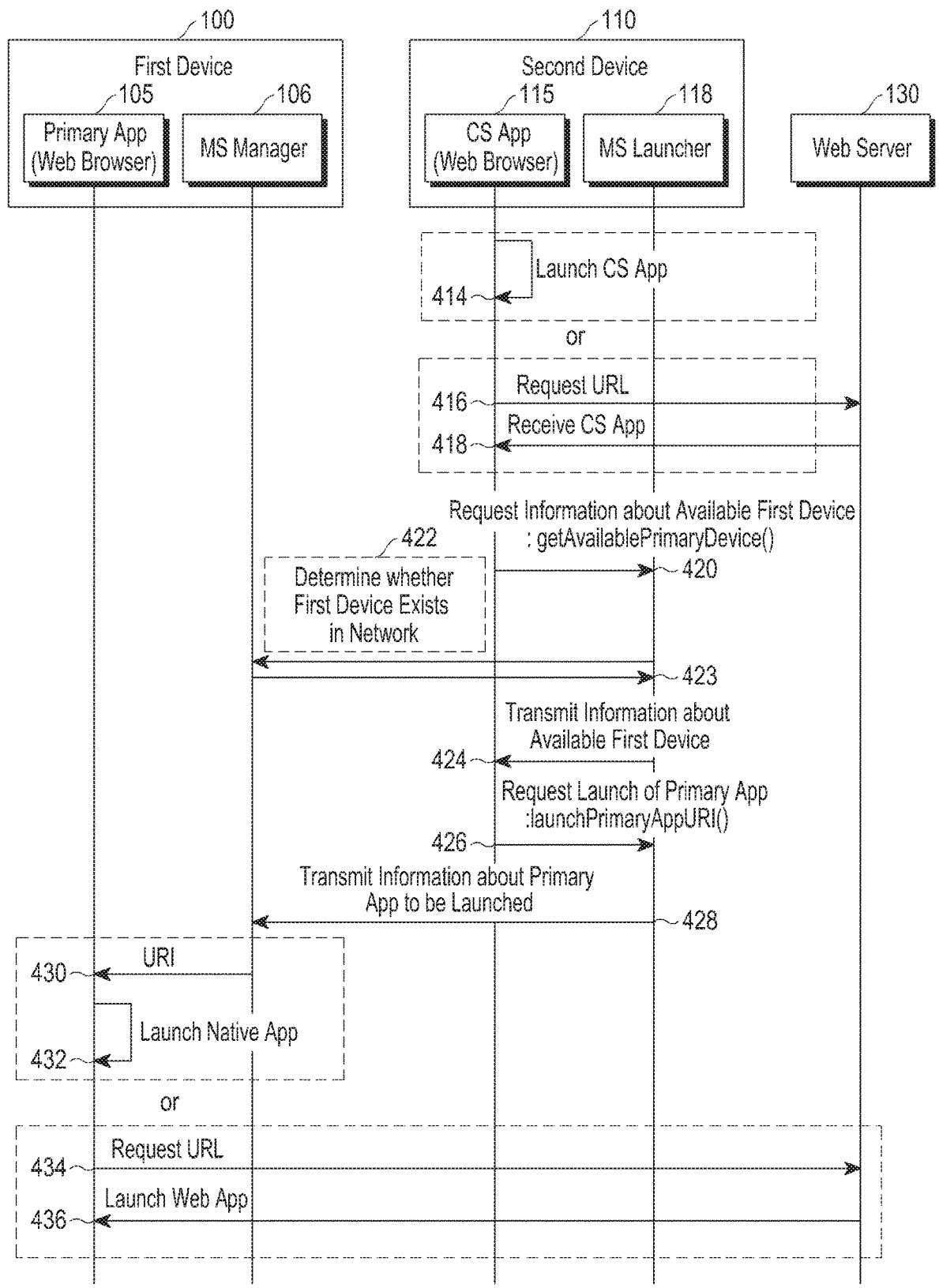
FIG. 4 is a signal flow illustrating a process of launching an App of a first device by a second device according to a first embodiment of the present disclosure.

FIG. 4 is a signal flow illustrating a process of launching an App of a first device by a second device according to a first embodiment of the present disclosure.

Referring to FIG. 4, if the CS App 115 is a native App, the CS App 115 is launched by a user in operation 414. If the CS App 115 is a web App, a URL request is sent to the web server 130 by the web browser 102 to request transmission of a web page in operation 416. Upon receiving the web page from the web server 130, the web browser 112 displays the received web page as the CS App 115 in operation 418.

The CS App 115 sends a request for a list of available first devices 100 to the MS launcher 118 by using a particular API (e.g., getAvailablePrimaryDevice( ) in operation 420.

The MS launcher 118 sends a signal to the MS manager 106 of the first device 100 to discover the first device 100 existing in the network in operation 422, and receives a response signal from the MS manager 106 in operation 423. A protocol used to discover the first device 100 may be a protocol defined in a third embodiment to be described below. The MS launcher 118 determines that the first device 100 is an available device, if receiving the response signal, and transmits information about the first device 100 to the CS App 115 in operation 424.

Meanwhile, it is illustrated in FIG. 4 that there is one first device 100, multiple first devices 100 may exist in the network, and in this case, a list of the first devices 100 may be generated in the MS launcher 118 and may be transmitted to the CS App 115.

The CS App 115 displays information about the first device 100 on the screen to receive user's selection of whether to use the first device 100. For example, how to display the information about the first device 100 on the screen, how to receive selection from the user, and whether the second device 110 automatically selects the first device 100 will not be defined in detail. However, since the information about the first device 100 is delivered to the CS App 115, the user's selection may be received through the CS App 115.

Once the first device 100 is selected, the CS App 115 transmits information for launching a primary App to the MS launcher 118 by using a particular API (launchPrimaryAppURI( )) in operation 426. That is, the CS App 115 delivers the information about the first device 100 and the information about the primary App 105, e.g., URI information to the MS launcher 118. Then, the MS launcher 118 transmits the information about the primary App 105 to be launched in the first device 100 to the MS manager 106 of the first device 100 based on the delivered information in operation 428.

The MS manager 106 transmits the URI information to the web browser 102 in operation 430. The web browser 102 then determines whether the primary App 105 to be launched is a native App or a web App based on the URI information. If the primary App 105 to be launched is a native App, the web browser 102 launches the native App as the primary App 105 in operation 432.

If the primary App 105 to be launched is a web App, the web browser 102 sends a URL request including the URI to the web server 130 to request transmission of the web page in operation 434. In operation 436, if receiving the web page from the web server 130, the web browser 102 displays the web page as the primary App 105.

As such, the primary App 105 has been launched by the CS App 115 of the second device 110, and thus the primary App 105 and the CS App 115 operate in cooperation with each other.

Table 2 is a table that briefly shows APIs that are available in the second device 110 as in operations 420 and 426 of FIG. 4.

TABLE 2

| API | Description | Input Factor | Output Factor |
| --- | --- | --- | --- |
| getAvailablePrimaryDevice(void) | Get a list of first devices available in a network | None | Success: Device list<br>Failure: Null |
| sendPrimaryAppURI(unit target_device, char*URI) | Send URI information of an App to a first device | unit target_device: An ID of a target first device<br>char* URI: Location information of a primary App to be launched | Success: True<br>Failure: False |

Referring to Table 2, getAvailablePrimaryDevice( ) has no input factor and is used to obtain a list of first devices available in a network. sendPrimaryAppURI( ) has two input factors: unit target_device indicating an ID of the first device which is an App launch target and URI information of the App of the first device to be launched, and may be used to launch the App of the first device.

Second Embodiment

Figure 5:
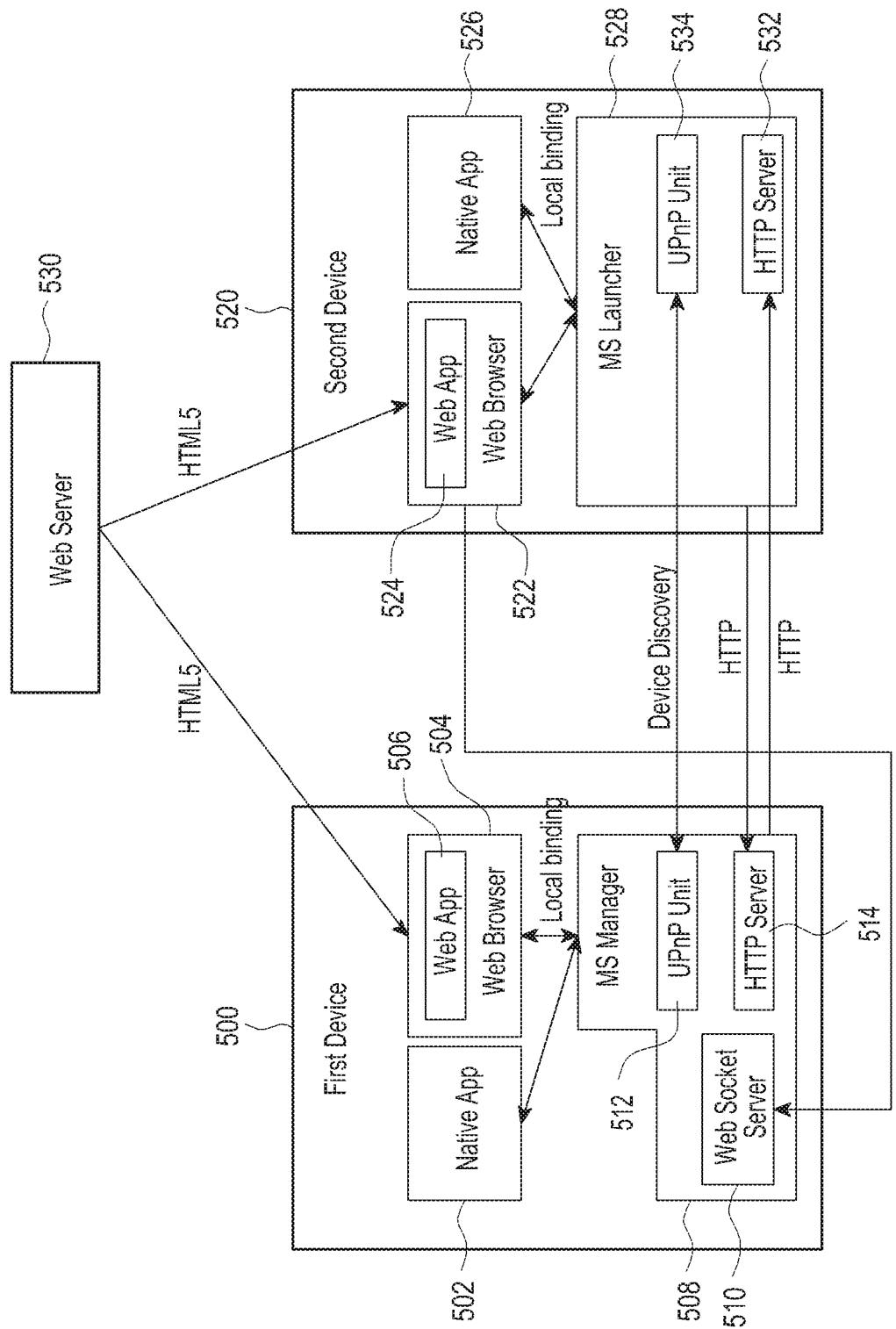
FIG. 5 illustrates a schematic structure of a wireless communication system according to a second embodiment of the present disclosure.

FIG. 5 illustrates a schematic structure of a wireless communication system according to a second embodiment of the present disclosure.

Referring to FIG. 5, the wireless communication system may include a web server 530 and multiple devices. The multiple devices communicate with each other in the same network, and may be, for example, devices capable of wireless communication in a home network. With reference FIG. 5, a description will be made of a first device 500 and a second device 520 capable of cooperating or interworking with each other among the multiple devices.

The first device 500 may include a web browser 504, a native App 502, and a web App 506, and an MS manager 508 for cooperating with the second device 520. The second device 520 may include a web browser 522, a web App 524, a native App 526, and an MS launcher 528.

The web browsers 504 and 522, the web Apps 506 and 524, the native Apps 502 and 526, the MS manager 508, and the MS launcher 528 of FIG. 5 perform operations corresponding to those of the web browsers 102 and 112, the web Apps 104 and 114, the native App 116, the MS manager 116, the MS manager 106, and the MS launcher 118 of FIG. 1.

However, the MS manager 508 and the MS launcher 528 of FIG. 5 may include detailed elements. That is, the MS manager 508 may include a universal plug and play (UPnP) unit 512, a hypertext transfer protocol (HTTP) server 514, and a web socket server 510, and the MS launcher 528 may include an UPnP unit 534 and an HTTP server 532.

The UPnP units 512 and 534 are included in the first device 500 and the second device 520, respectively, and perform a device discovery operation. More specifically, the UPnP units 512 and 534 discover another device in a network by using a simple service discovery protocol (SSDP) and notify the network of their existence.

The HTTP servers 514 and 532 are included in the first device 500 and the second device 520, respectively, receive a request through an HTTP protocol, and perform an operation corresponding to the received request. In the second embodiment of the present disclosure, the HTTP servers 514 and 532 receive an HTTP GET request and an HTTP POST request from another device to launch the App, and perform an operation corresponding to the requests. In the second embodiment of the present disclosure, the HTTP servers 514 and 532 may not perform an operation of a general web server for distributing a web page except for the above-described operations.

The web socket server 510 is included in the first device 500 and performs an operation of processing a web socket protocol. In the second embodiment of the present disclosure, the web socket server 510 receives a web socket request from the second device 520 and processes the received web socket request to enable inter-App communication between the first device 500 and the second device 520.

Hereinafter, a discovery operation between the first device 500 and the second device 520 will be described with reference to FIG. 6.

Figure 6:
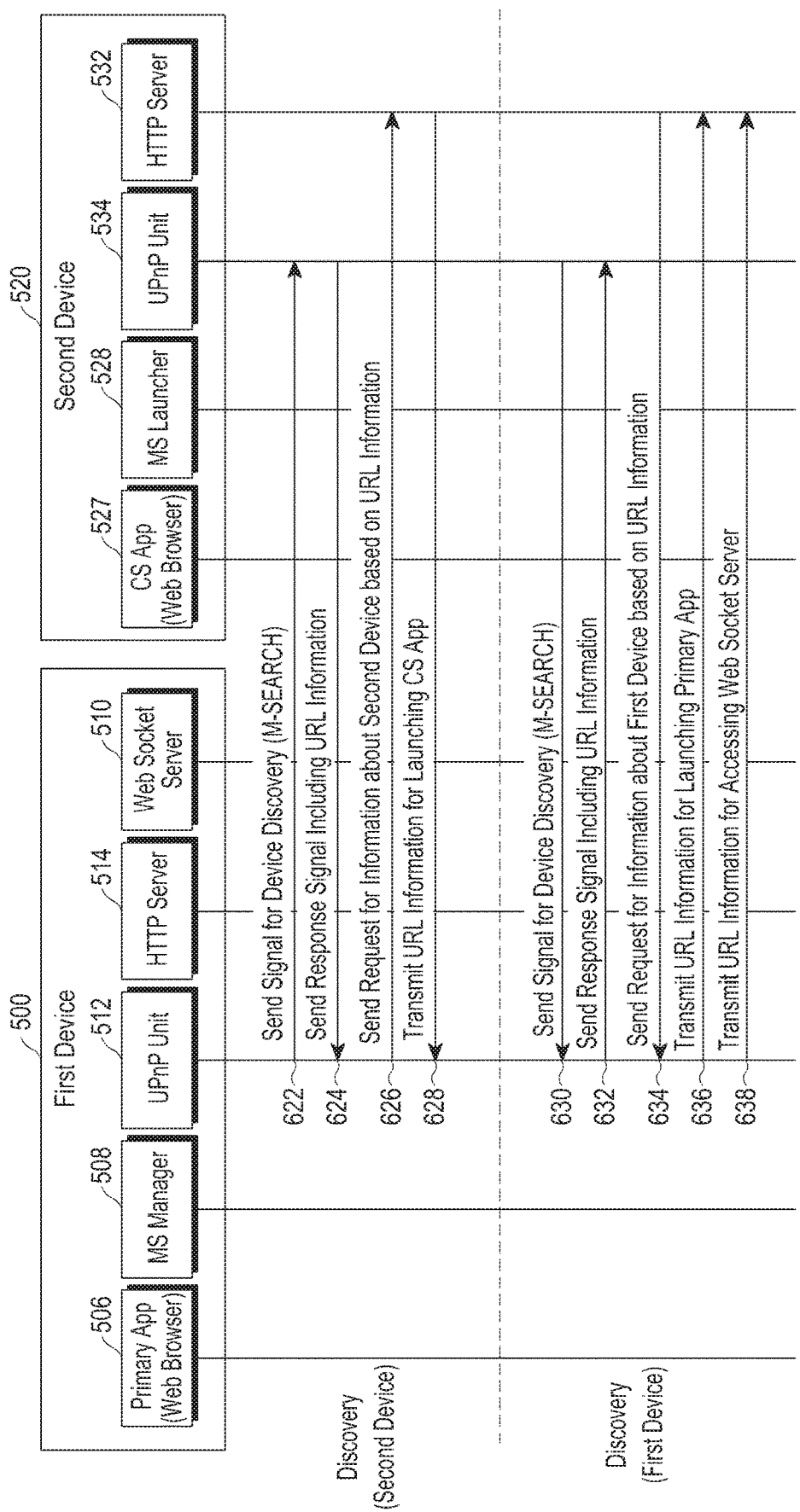
FIG. 6 is a signal flow illustrating a discovery process between a first device and a second device according to a second embodiment of the present disclosure.

FIG. 6 is a signal flow illustrating a discovery process between a first device and a second device 520 according to a second embodiment of the present disclosure. The process described with reference to FIG. 6 may correspond to detailed operations of a detailed protocol of getAvailableCSDevice( ) in Table 1 described above.

Referring to FIG. 6, first, a description will be made of an example where the first device 500 discovers the second device 520. The UPnP unit 512 of the first device 500 transmits a signal for device discovery in operation 622. For example, the UPnP unit 512 transmits a signal as shown in Table 3 by using an M-SEARCH method of an SSDP to discover the second device 520 available in the network.

TABLE 3

M-SEARCH*HTTP/1.1
MAN: "ssdp:discover"
MX: seconds to delay response
ST: urn:samsung.com:service:MultiScreenService:1

Once receiving the above signal, the UPnP unit 534 of the second device 520 transmits a response signal including URL information to notify the first device 500 of existence of the second device 520 in operation 624. For example, the UPnP unit 534 may transmit a response signal as shown in Table 4, and the response signal may include URL information related to information about the second device 520 in a LOCATION header.

TABLE 4

HTTP/1.1 200 OK
LOCATION: URL for UpnP description for root device
ST: urn:samsung.com:service:MultiScreenService:1
. . .

Upon receiving the response signal, the UPnP unit 512 of the first device 500 sends a request for the information about the second device 520 by using the URL information included in the LOCATION header of the response signal in operation 626. The request may be sent based on an HTTP GET method.

The HTTP server 532 of the second device 520 sends a response signal including URL information used to launch an App of the second device 520, that is, a CS App 527, to the first device 500 in response to the request in operation 628. The response signal, for example, in the form of an HTTP Response, may include a header (x-Application-URL) including the URL information used to launch the CS App 527 as shown in Table 5.

TABLE 5

HTTP/1.1 200 OK
x-Application-URL:http//192.168.1.52:80/ws/apps/

Next, a description will be made of an example where the second device 520 discovers the first device 500.

The UPnP unit 534 of the second device 520 sends a signal for device discovery in operation 630. For example, the UPnP unit 534 may send a signal as shown in Table 6 by using the M-SEARCH method of the SSDP to discover the first device 500 available in the network.

TABLE 6

M-SEARCH * HTTP/1.1
MAN:"ssdp:discover"
MX: seconds to delay response
ST: urn:samsung.com:service:MultiScreenService:1

Upon receiving the above signal, the UPnP unit 512 of the first device 500 sends a response signal including URL information to the second device 520 to notify the second device 520 of existence of the first device 500 in operation 632. For example, the UPnP unit 512 may send a response signal as shown in Table 7, and the response signal may include URL information related to information about the first device 500 in a LOCATION header.

TABLE 7

HTTP/1.1 200 OK
LOCATION: URL for UPnP description for root device
ST:urn:samsung.com:service:MultiScreenService:1
. . .

Upon receiving the response signal, the HTTP server 532 of the second device 520 sends a request for the information about the first device 500 by using the URL information included in the LOCATION header of the response signal in operation 634. The request may be sent based on the HTTP GET method.

The UPnP unit 512 of the first device 500 sends a response signal including the URL information used to launch an App of the first device 500, that is, a primary App 506, to the second device 520 in response to the request in operation 636. The response signal, for example, in the form of an HTTP Response, may include a header (x-Application-URL) including the URL information used to launch the primary App 506 as shown in Table 8.

Since the first device 500 has the web socket server 510 capable of performing inter-App communication with the App of the second device 520, the first device 510 transmits a header (x-WebSocket) including URL information for accessing the web socket server 510 to the second device 520 through the response signal in operation 638.

TABLE 8

HTTP/1.1 200 OK
x-Application-URL:http//192.168.1.52:80/ws/apps/
x-WebSocket:ws://192.168.1.52/

Figure 7:
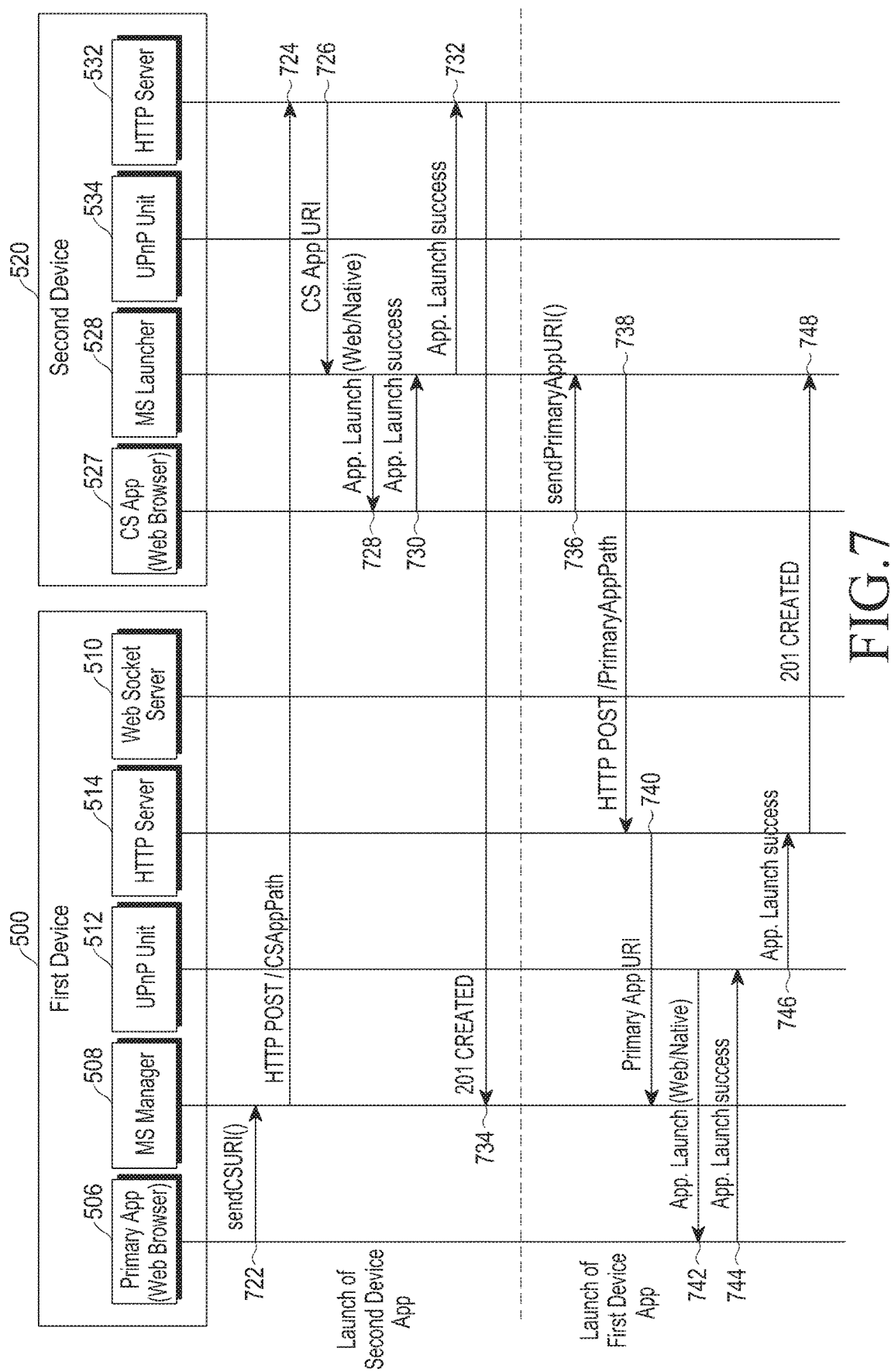
FIG. 7 is a signal flow illustrating an inter-App launch process between a first device and a second device according to a second embodiment of the present disclosure.

FIG. 7 is a signal flow illustrating an inter-App launch process between a first device and a second device according to a second embodiment of the present disclosure. The process to be described with reference to FIG. 7 may correspond to detailed operations of a detailed protocol of sendCSURI( ) of Table 1 described above.

Referring to FIG. 7, first, a description will be made of a process of launching an App of the second device 520 by the first device 500. The MS manager 508 of the first device 500 receives two factors from the browser 506 of the first device 500 through sendCSURI( ) in operation 722. One of the two factors, unit target_device, indicates an ID of the second device 520 which is an App launch target, and the MS manager 508 obtains URL information (x-Application-URL) for launching the App of the second device 520 based on a second device information table. The second device information table may be stored and managed in the MS manager 508 and is as shown in Table 9.

TABLE 9

| Second Device ID | Device Description | x-Application-URL |
|---|---|---|
| 112ABCD | Tom's Galaxy S4 | http://192.168.1.52:80/ws/apps/ |
| 114DCDC | Sally's Galaxy Notes 3 | http://192.168.1.53:80/ws/apps/ |
| 21122A | Galaxy Notes 10.1 | http://192.168.1.54:80/ws/apps/ |

As shown in Table 9, the second device information table may include a second device ID, device description information indicating a device type, second device App URL information, and the like.

The MS manager 508 of the first device 500 sends an HTTP POST request as shown in Table 10 to the HTTP server 532 of the second device 520 based on the obtained URL information in operation 724.

TABLE 10

POST/CSAppPath HTTP1.1
Host:hostname
User-Agent:OS/version Browser/version HbbTV/2.0
{"ContentsID":"1111201","ContentsName":"Contents","PlayingTime":
"12.00"}

The App to be launched in the second device 520 may be indicated in CSAppPath by URI information which is the other factor of sendCSURIQ, that is, char*URI. A factor necessary for launching the App of the second device 520 may be transmitted through a BODY part of an HTTP in the form as shown in Table 10.

The HTTP server 532 of the second device 520 parses the received HTTP POST request and delivers CSAppPath information together with the factor in the BODY part to the MS launcher 528 in operation 726. Then, the MS launcher 528 launches the CS App 527, which is the App of the second device 520, based on URI information included in CSAppPath in operation 728.

Upon receiving a launch result (e.g., successful launch of the CS App 527) in operation 730, the MS launcher 528 transmits the launch result of the CS App 527 to the HTTP server 532 of the second device 520 in operation 732. The HTTP server 532 then sends one (e.g., 201 CREATED) of response codes as shown in Table 11 to the MS manager 508 of the first device 500 in operation 734.

TABLE 11

| Response Code | Description |
|---|---|
| 201 CREATED | The app was launched successfully. A LOCATION head is returned that specifiers the name of the running instance of the app. |
| 404 NOT FOUND | There is no such app. |
| 503 SERVICE UNAVAILABLE | If the app could not be launched momentarily, e.g. because the CS Device is busy with other application. |

In Table 11, the response code 201 CREATED indicates that the CS App 527 has been successfully launched, a response code 404 NOT FOUND indicates that the CS App 527 does not exist, and a response code 503 SERVICE UNAVAILABLE indicates that the CS App 527 may not be launched temporarily because the second device 520 launches another App.

Next, a description will be made of a process in which the second device 520 launches the App of the first device 500.

The MS launcher 528 of the second device 520 receives two factors from the browser 522 of the second device 520 through sendPrimaryAppURI( ) in operation 736. One of the two factors, unit target_device, indicates an ID of the first device 520 which is an App launch target, and the MS launcher 528 obtains URL information (x-Application-URL) for launching an App of the first device 500 based on a first device information table. The first device information table is stored and managed in the MS launcher 528, and may be as shown in Table 12.

TABLE 12

| First Device ID | Device Description | x-Application-URL | x-WebSocket |
|---|---|---|---|
| 433ABC12 | Samsung SmartTV 9000 | http://192.168.1.10:80/ws/apps/ | ws://192.168.1.10/ |
| 43414DCDC | Samsung SmartTV 4500 | http://192.168.1.11:80/ws/apps/ | ws://192.168.1.11/ |

As shown in Table 12, the first device information table may include a first device ID, device description information indicating a device type, first device App URL information, web socket information, and the like.

The MS launcher 528 of the second device 520 sends an HTTP POST request as shown in Table 13 to the HTTP server 514 of the first device 500 based on the obtained URL information in operation 738.

TABLE 13

POST /PrimaryAppPath HTTP1.1
Host:hostname
User-Agent:OS/version Browser/version HbbTV/2.0
{"ContentsID":"1111201","ContentsName":"Contents","PlayingTime":
"12.00"}

The App to be launched in the first device 500 may be indicated in PrimaryPath by URI information which is another factor of sendPrimaryAppURI( ), that is, char*URI. The factor necessary for launching the App of the first device 500 may be transmitted through the BODY part of the HTTP in a form as shown in Table 13.

The HTTP server 514 of the first device 500 parses the received HTTP POST request in operation 740 and delivers PrimaryAppPath information together with the factor of the BODY part to the MS manager 508 in operation 740. The MS manager 508 then launches the primary App 506, which is the App of the first device 500, based on URI information included in PrimaryAppPath, in operation 742.

Upon receiving a launch result of the primary App 506 (e.g., successful launch of the primary App 506) in operation 744, the MS manager 508 transmits the launch result of the primary App 506 to the HTTP server 514 of the first device 500 in operation 746. The HTTP server 514 then sends one (e.g., 201 CREATED) of response codes as shown in Table 14 to the MS launcher 528 of the second device 520 in operation 748.

TABLE 14

| Response Code | Description |
| --- | --- |
| 201 CREATED | The app was launched successfully. A LOCATION head is returned that specifiers the name of the running instance of the app. |
| 404 NOT FOUND | There is no such app |
| 503 SERVICE UNAVAILABLE | If the app could not be launched momentarily, e.g. because the TV is scanning channels |

In Table 14, the response code 201 CREATED indicates that the primary App 506 has been successfully launched, a response code 404 NOT FOUND indicates that the primary App 506 does not exist, and a response code 503 SERVICE UNAVAILABLE indicates that the primary App 506 may not be launched temporarily because the first device 500 performs another operation (e.g., a TV channel scan operation and the like).

Figure 8:
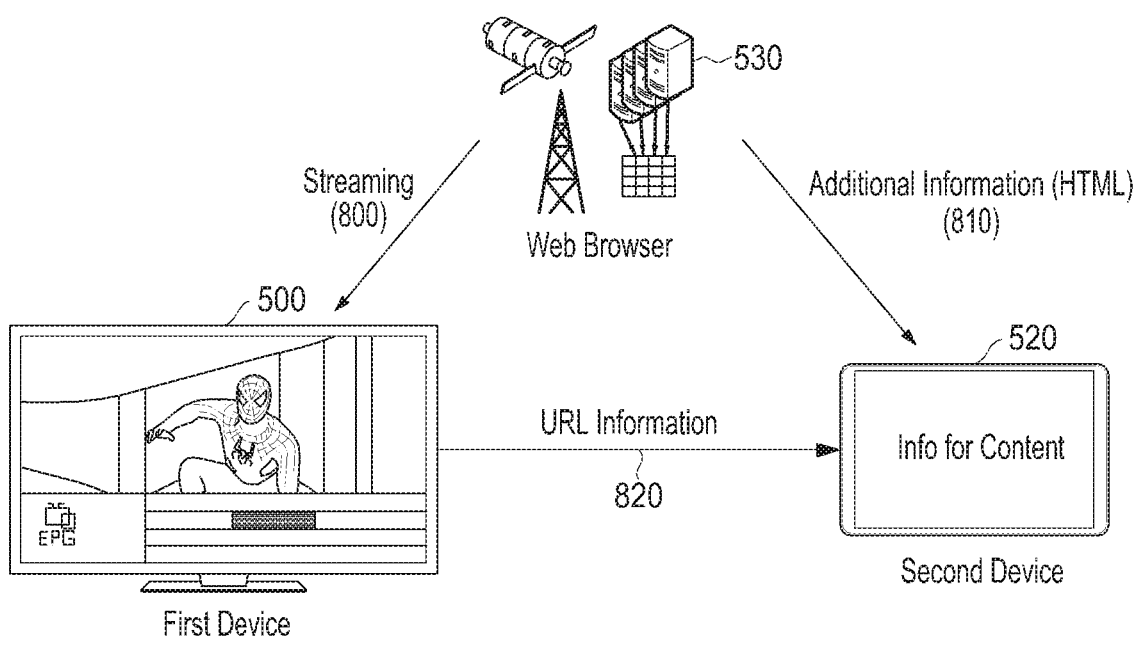
FIG. 8 illustrates an example to which a method according to a second embodiment of the present disclosure is applied.

FIG. 8 illustrates an example to which a method according to a second embodiment of the present disclosure is applied.

Referring to FIG. 8, the web server 530 is a broadcasting company's web server, the first device 500 is a DTV, and the second device 520 is a mobile terminal.

A user may watch a movie 800 streamed from the web server 530. While watching the movie 800, the user may desire to receive additional information 810 about the movie 800 through the second device 520.

In this case, the first device 500 launches an App of the second device 520 for providing the additional information 810 based on URL information 820 of the App of the second device 520. Once the App of the second device 520 is launched, the second device 520 receives the additional information 810 from the web server 500 and provides the additional information 810 to the user. The additional information 810 may include, for example, casting information, a synopsis of the movie 800, on-line shopping, and the like.

Third Embodiment

Figure 9:
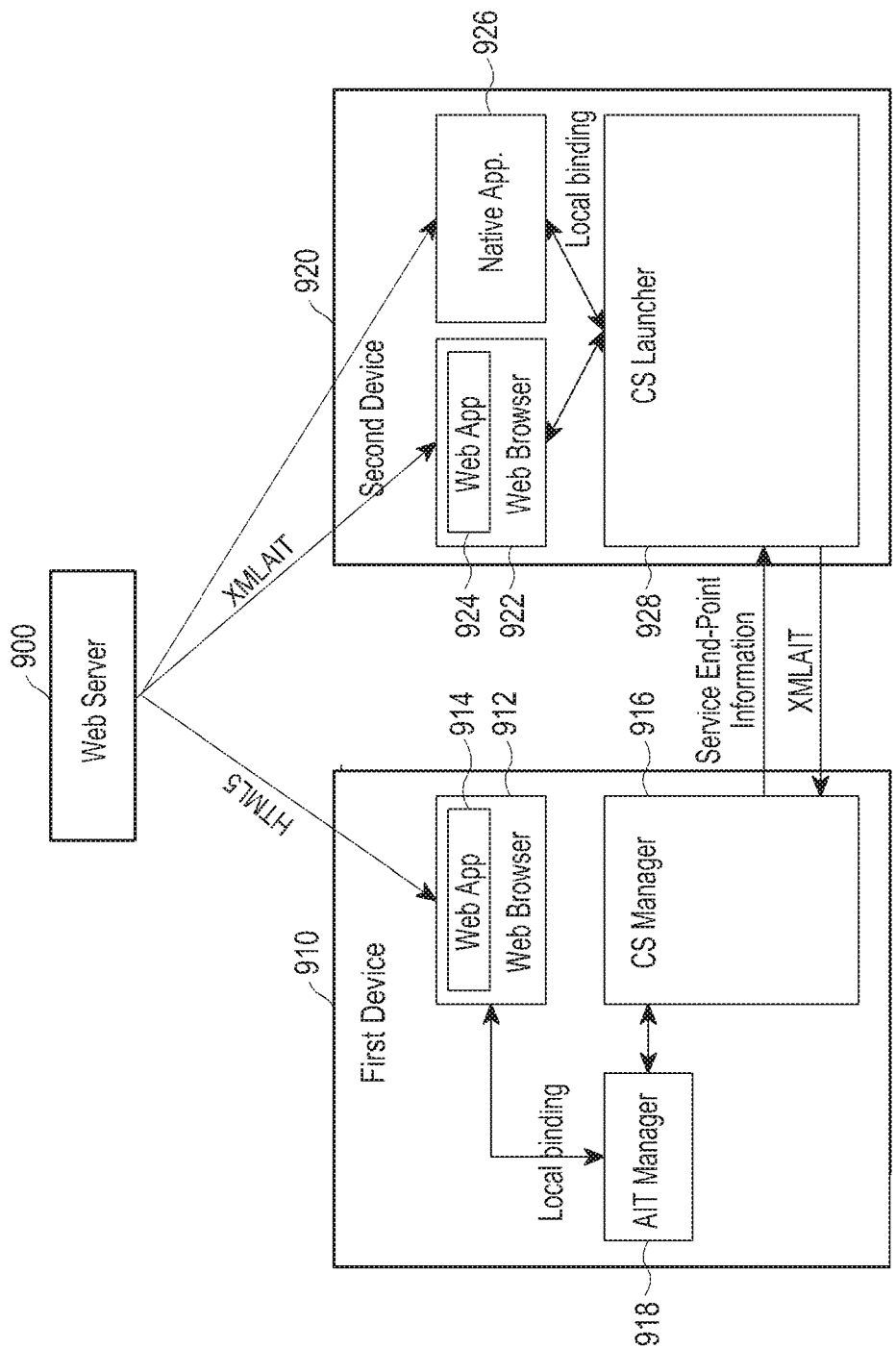
FIG. 9 illustrates a schematic structure of a wireless communication system according to a third embodiment of the present disclosure.

FIG. 9 illustrates a schematic structure of a wireless communication system according to a third embodiment of the present disclosure.

Referring to FIG. 9, the wireless communication system may include a web server 900 and multiple devices. The multiple devices may communicate with each other in the same network, and may be, for example, devices capable of wireless communication in a home network. With reference to FIG. 9, a description will be made of a first device 910 and a second device 920 capable of cooperating or interworking with each other among the multiple devices.

The web server 900 provides web Apps 914 and 924 that are available in the first device 910 and the second device 920, respectively. The web Apps 914 and 924 may include an HTML, a CSS, JavaScript, video, images, and the like. The web server 900 may exist in a local network or an external network (cloud). The web server 900 may provide App information for launching an App of the first device 910, that is, App information (hereinafter, referred to as 'XLML AIT') generated based on an extensible markup language (XML). A web server for providing the XML AIT and a web server for providing a web App may be the same device or different devices.

The first device 910 indicates a main device in which an App is launched. For example, the first device 910 may be a common device such as a DTV or an STB, and the App may be an App related to broadcasting.

The second device 920 indicates an auxiliary device that launches an App by cooperating with the first device 910. The second device 920 may be a personal terminal such as a mobile terminal or a tablet PC.

The first device 910 and the second device 920 may include web browsers 912 and 922, respectively. The web browsers 912 and 922 are used to launch web Apps 914 and 924, respectively.

The second device 920 may include a native App 926. The native App 926 indicates an App that is launched in a platform (OS) (e.g., Android, iOS, Windows, TiZen, and the like) of the second device 920. The native App 926 may be compiled into a binary code and launched.

In the third embodiment of the present disclosure, the first device 910 may include a companion screen (CS) manager 916 and an application information table (AIT) manager 918. The CS manager 916 performs an operation necessary for cooperation or interworking with the second device 920. For example, the CS manager 916 may perform an operation of searching for or discovering the second device 920 in a network, an operation of receiving App information about an App to be launched in the first device 910 from the second device 920, and an operation for inter-App communication between the first device 910 and the second device 920.

The AIT manager 918 is included in the first device 910, and receives and parses XML AIT. The XML AIT is information transmitted from the second device 920, and is received by the CS manager 916 and is delivered to the AIT manager 918. The AIT manager 918 parses the XML AIT to extract the App information and launches the App based on the extracted App information.

The second device 920 may further include a CS launcher 928. The CS launcher 928 performs an operation necessary for cooperating with the first device 910. For example, the CS launcher 928 performs an operation of searching for or discovering the first device 910 in the network, an operation of sending a request for launching an App to the first device 910 at the request of the App, an operation of delivering information about the App, and an operation for inter-App communication between the first device 910 and the second device 920.

A description will be made of a method for launching an App of the first device 910 by the second device 920 in the wireless communication system as shown in FIG. 9.

Figure 10:
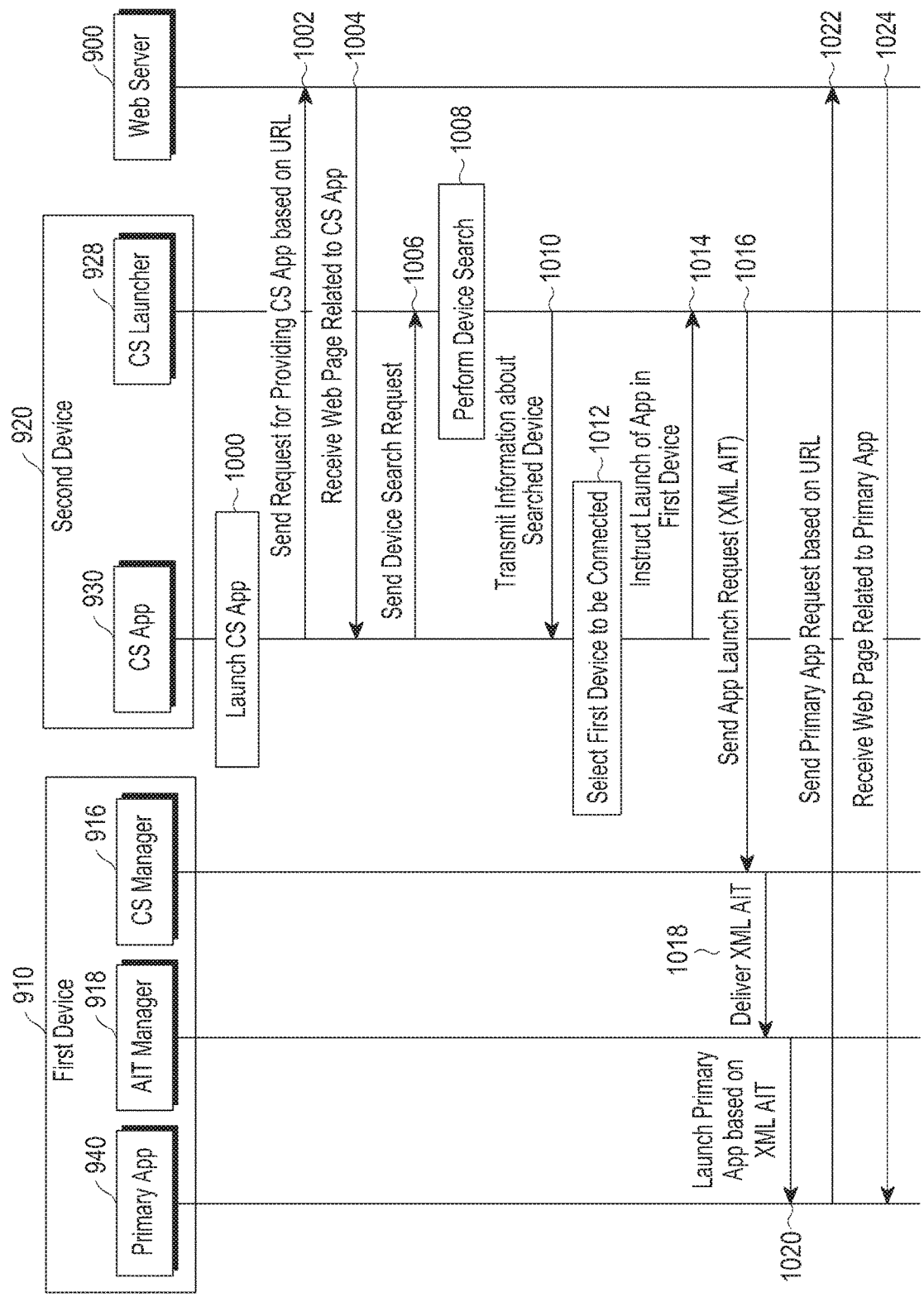
FIG. 10 is a signal flow illustrating a process of launching an App of a first device by a second device in a wireless communication system according to a third embodiment of the present disclosure.

FIG. 10 is a signal flow illustrating a process of launching an App of a first device by a second device in the wireless communication system according to a third embodiment of the present disclosure.

Referring to FIG. 10, the second device 920 launches a CS App 930 in operation 1000. The CS App 930 may be an App of the second device 920 used to launch an App of the first device 910. The CS App 930 may be one of a web App 924 and a native App 926, and if the CS App 930 is the web App 924, the CS App 930 is launched in operations 1002 and 1004.

That is, if the CS App 930 is the web App 924, the second device 920 sends a request for providing the CS App 930 to the web server 900 in operation 1002 and receives a web page (including an HTML, a CSS, JavaScript, images, and the like) related to the CS App 930 from the web server 900 in operation 1004. The second device 920 launches the received web page as the CS App 930. Operations 1002 and 1004 may be performed using the web browser 922, and may also be omitted if the CS App 930 is the native App 926.

Once the CS App 930 is launched, the CS App 930 sends a device search request for requesting search for another device available in the network to the CS launcher 928 in operation 1006. The CS launcher 928 then performs device search in operation 1008 and transmits information about the found device to the CS App 930 in operation 1010.

The device search request and the device search operation may be sent and performed based on a preset API of the CS App 930. That is, if the API is launched by the CS App 930, a substantial device search operation is performed by the CS launcher 928. The API may be, for example, discoverHbbTVdevices( ), and may vary according to implementation.

If multiple devices are found, information about the multiple devices is transmitted to the CS App 930. In operation 1012, one of the multiple devices, that is, the first device 910 may be selected in the CS App 930 in operation 1012. The first device 910 may be arbitrarily selected by the CS App 930, or may be selected by providing a user interface (UI) allowing selection of one of the multiple devices by the CS App 930 and receiving an input from the user through the UI.

Even when one device is found, information about the discovered device may be provided to the user through the UI and an input of whether to connect to the discovered device may be received from the user. A way to show the information through the UI and a way to process the user's input may be various according to implementation.

If the first device 910 is selected, the CS App 930 instructs the CS launcher 928 to launch the App in the first device 910 in operation 1014. To this end, the CS App 930 may call a preset API. The API may be, for example, launchHbbTVApp( ) and may vary according to implementation.

App launch of the first device 910 is performed in response to an HTTP request, and includes two processes: a process of retrieving information about the first device 910 and a process of launching the App based on the information. A detailed protocol used in these processes will be described below in detail with reference to FIG. 12.

The CS launcher 928 sends an App launch request to the CS manager 916 of the first device 910 in operation 1016. The App launch request is based on an HTTP POST method, and the BODY part of the HTTP request includes XML (that is, XML AIT) including App information about the App of the first device 910. Thus, the CS manager 916 may have a web server function capable of processing the App launch request.

The CS manager 916 processes the App launch request and sends the XML AIT to the AIT manager 918 in operation 1018. The AIT manager 918 launches an App of the first device 910, which may be used in cooperation with a CS App 930 of the second device 920, that is, a primary App 940, based on the XML AIT in operation 1020. Herein, if the primary App 940 is a native App, the whole process is terminated. If the primary App 940 is a web App, operations 1022 and 1024 are performed.

The first device 910 sends a request for a web App to the web server 900 based on URL information in operation 1022, and receives a web page (including an HTML, a CSS, JavaScript, and images) related to the primary App 940 from the web server 900 in operation 1024. The first device 910 launches the primary App 940 based on the received web page. Operations 1022 and 1024 may be performed by the web browser 912.

Table 15 briefly shows APIs used in FIG. 10.

TABLE 15

| API | Description | Input Factor | Output Factor |
|---|---|---|---|
| discoverHbbTVdevices(void) | Get a list of first devices available in a network | None | Success: Device list<br>Failure: Null |
| launchHbbTVApp(unit target_device, char*XML) | Send XML AIT information of an App to be launched to a first device | unit target_device: An ID of a target first device<br>char* XML: Information of a primary App to be launched | Success: True<br>Failure: False |

Referring to Table 15, discoverHbbTVdevices( ) has no input factor and is used to obtain a list of first devices available in the network. launchHbbTVApp( ) has two input factors: unit target_device indicating an ID of the first device that is an App launch target and App information about an App of the first device to be launched, which has an XML format, and may be used to launch the App of the first device.

Next, with reference to FIG. 11, operation 1008 of FIG. 10 will be described in detail.

Figure 11:
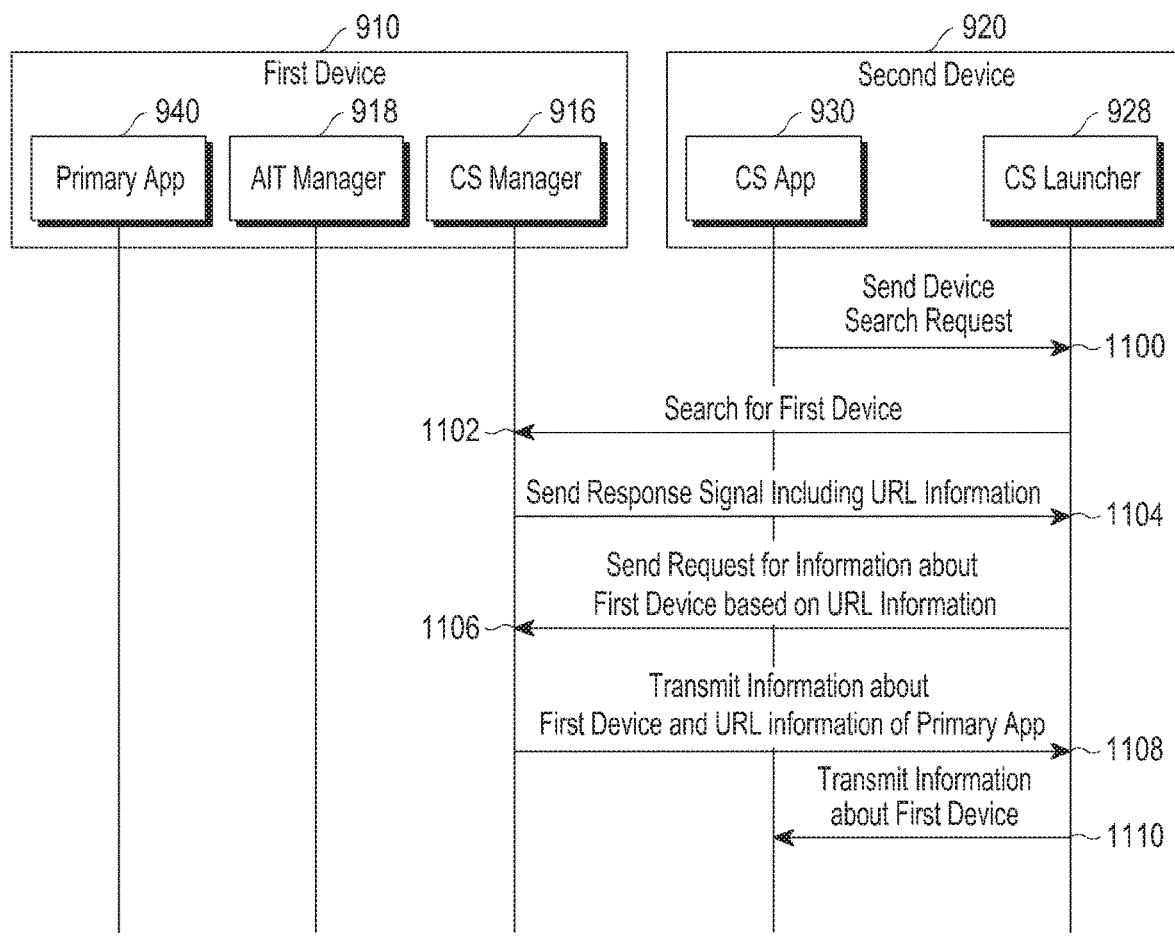
FIG. 11 is a signal flow illustrating a process of searching for a first device by a second device according to a third embodiment of the present disclosure.

FIG. 11 is a signal flow illustrating a process of searching for a first device by a second device according to a third embodiment of the present disclosure.

Referring to FIG. 11, upon receiving a device search request from the CS App 930 in operation 1100, the CS launcher 928 of the second device 920 searches for the first device 910 in operation 1102. For example, the CS launcher 928 may search for the first device 910 that needs cooperation in association with the CS App 930 by using an M-SEARCH method (M-SEARCH request and response) of the SSDP. The CS launcher 928 may specify a device by including information about a device to be searched for in an ST header as shown in Table 16.

TABLE 16

M-SERACH * HTTP/1.1
MAN: "ssdp:discover"
MX: seconds to delay response
ST:urn:dial-multiscreen-org:service:dial:1

Upon receiving a signal as shown in Table 16, the CS manager 916 of the first device 910 sends a response signal to the received signal to the second device 920 in operation 1104. The response signal includes URL information of an XML file including UPnP device information as shown in Table 17, and the URL information may be included in a LOCATION header.

TABLE 17

HTTP:/1.1 200 OK
LOCATION: URL for UPnP description
CACHE-CONTROL:max-age=1800
ST:urn:dial-multiscreen-org:service:dial:1

Upon receiving the response signal, the CS launcher 928 sends a request for information about the first device 910 based on the URL information included in the response signal in operation 1106. That is, the CS launcher 928 sends a request for UPnP device information regarding the first device 910 by using the HTTP GET method based on the URL information included in the LOCATION header as shown in Table 18.

TABLE 18

GET LOCATION-URL

In response to the request, the CS manager 916 then transmits the information about the first device 910 and the URL information of the App of the first device 910, which may be used in cooperation with the CS App 930, that is, the URL information of the primary App 940, to the second device 920 in operation 1108. That is, the CS manager 916 transmits the URL information capable of launching the primary App 940, together with the XML file including the UPnP device information, to the second device 920 through an "Application-URL" header as shown in Table 19.

TABLE 19

HTTP:/1.1 200 OK
Application-URL: <App Launch URL>

In Table 19, the "Application-URL" header is arbitrarily set in an embodiment of the present disclosure to include the URL information capable of launching the primary App 940, and may be used with a different name according to implementation.

Once the CS launcher 928 obtains the information about the first device 910 through the foregoing process, the CS launcher 928 delivers the obtained information to the CS App 930 in operation 1110 and terminates the device search operation.

A method for launching the App of the first device 910 as described in operation 1016 of FIG. 10 will be described with reference to FIG. 12.

Figure 12:
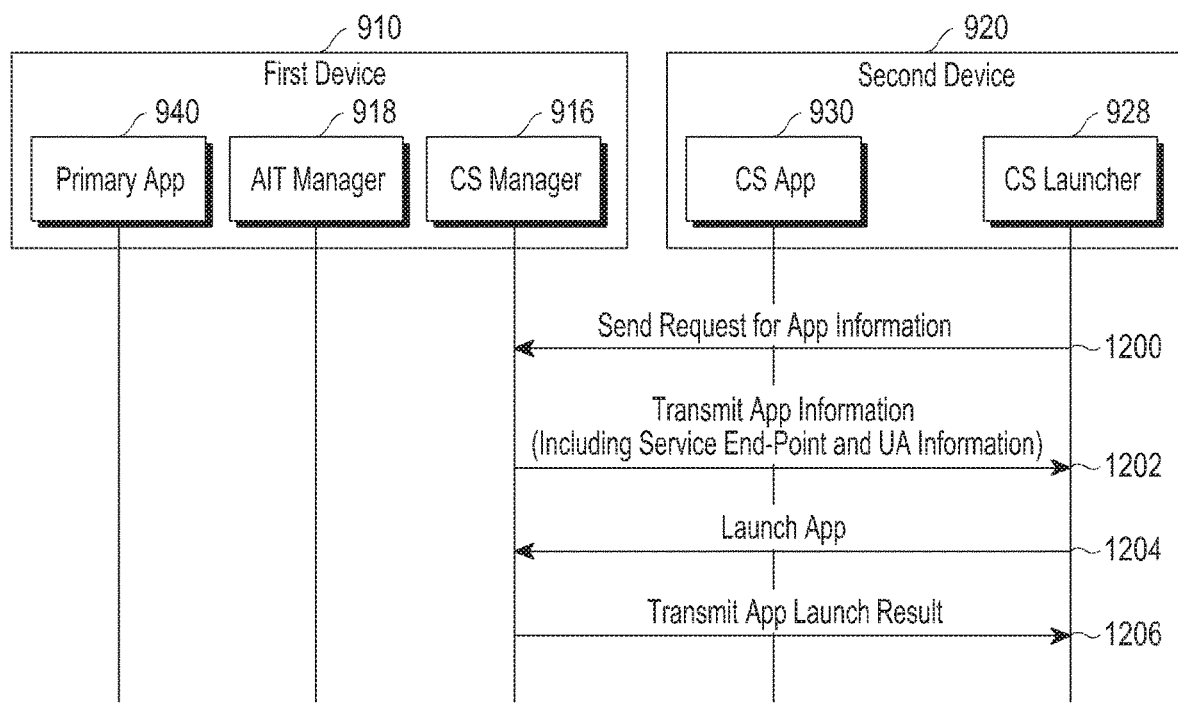
FIG. 12 is a signal flow illustrating a process of launching an App of a first device in a wireless communication system according to a third embodiment of the present disclosure.

FIG. 12 is a signal flow illustrating a process of launching the App of a first device in a wireless communication system according to a third embodiment of the present disclosure.

Referring to FIG. 12, the CS launcher 928 of the second device 920 sends a request for information about the first device 910, e.g., App information in operation 1200. The request may be sent using the HTTP GET method, and may be as shown in Table 20.

TABLE 20

GET <App Launch URL>/AppName

In Table 20, <App Launch URL> indicates the URL information of an Application-URL header delivered from the first device 910 in operation 1108 of FIG. 11, and AppName indicates a name of the App of the first device 910. In the third embodiment of the present disclosure, the name of the App is used for a method for limiting a particular service provided in the third embodiment of the present disclosure. Although the particular service is limited to HbbTV in the third embodiment of the present disclosure, the service may vary according to implementation.

In response to the request, the CS manager 916 of the first device 910 transmits App information as the information about the first device 910 in operation 1202. The App information may include an XML file including service end-point information (additional service information) and user agent (UA) information. The UA information may be used by the second device 920 to determine capabilities of the first device 910.

The App information may be expressed as shown in Table 21.

TABLE 21

HTTP/1.1 200 OK
...
<?xml version= "1.0" encoding= "UTF8" ?>
<service xmlns= "urn:dial-multiscreen-org:schemas:dial" dialVer= "1.7" >
    <name>HbbTV Companion Screen Services</name>
   <additionalData>
     <x_HbbTV_terminal_UAString> ...
     </x_HbbTV_terminal_UAString>
     <x_HbbTV_App2AppURL> ... </x_HbbTV_App2AppURL>
     <x_HbbTV_InterDevSyncURL> ...
     </x_HbbTV_InterDevSyncURL>
   </additionalData>
</service>

Referring to Table 21, <x_HbbTV_terminal_UAString> indicates UA string information, <x_HbbTV_App2AppURL> indicates information for inter-App communication, and <x_HbbTV_InterDevSyncURL> indicates information for providing a synchronization service between devices. If there is information necessary for each service in addition to the information shown in Table 21, such information may be added to the App information.

The CS launcher 928 receives the App information and sends an App launch request to the CS manager 916 based on the received information in operation 1204. This operation may be performed based on the HTTP POST method, and the APP launch request may be, for example, as shown in Table 22.

TABLE 22

POST <App Launch URL>/AppName
Content-Type:text/plan:charset= "utf-8"
...
<XMLAIT>

Referring to Table 22, <App Launch URL>/AppName is the same as <App Launch URL>/AppName of Table 20, and information about an App to be actually launched may be delivered in an XML form (XML AIT) through a BODY part. The delivered XML AIT may include information as shown in Table 23.

TABLE 23

| Field/Element | Description |
| --- | --- |
| appName | Name of App |
| applicationIdentifier | App ID (including orgID and appID) |
| applicationDescriptor/type | Type of App (HTML/DVB) |
| applicationDescriptor/controlCode | App control code (AUTOSTART, PRESENT, DESTROY, KILL, PREFETCH, REMOTE, DISABLED, PLAYBACK_AUTOSTART) |
| applicationDescriptor/visibility | Whether visible to another App |
| applicationDescriptor/serviceBound | Whether App is dependent on service |
| applicationDescriptor/priority | Priority of App |
| applicationDescriptor/version | Version of App |
| applicationDescriptor/mhpVersion | Multimedia home platform (MHP) version |
| applicationDescriptor/icon | Whether App includes icon |
| applicationDescriptor/storageCapabilities | Whether App has storage/cache |
| applicationTransport/ | Transport protocol (HTTP, DVB) |
| applicationLocation/ | URI of App |
| applicationBoundary/ | Provide data needed for App |
| applicationSpecificDescriptor/ | Description of additional details according to type of App |
| applicationUsageDescriptor/ | Service provided by App (Text and the like) |

The CS manager 916 launches the App of the first device 910 based on the XML AIT. The CS manager 916 transmits a launch result to the second device 920 by using an HTTP response code as shown in Table 24 in operation 1206.

TABLE 24

HTTP/1.1 201 CREATED

In Table 24, "201 CREATED" indicates an HTTP response code that may be, for example, as shown in Table 25.

TABLE 25

| Response Code | Description |
| --- | --- |
| 201 CREATED | The HbbTV application was launched successfully. |
| 401 Unauthorized | The operation is rejected by the user. |
| 403 Forbidden | The operation is rejected by the HbbTV device. |
| 404 NOT FOUND | There is no such HbbTV application. |
| 503 SERVICE UNAVAILABLE | If the HbBTV application could not be launched momentarily, e.g. because the TV is scanning channels. |

Referring to Table 25, "201 CREATED" indicates that the App of the first device 910 has been successfully launched (e.g., successful launch of an HbbTV App in Table 25), "401 Unauthorized" indicates that App launch of the first device 910 has been rejected by the user, "403 Forbidden" indicates that App launch of the first device 910 has been rejected by the first device 910, "404 NOT FOUND" indicates that the App of the first device 910 does not exist, and "503 SERVICE UNAVAILABLE" indicates a case where the App of the first device 910 may not be temporarily launched due to a particular operation of the first device 910.

Next, a description will be made of a process of terminating the App of the first device 910 by the second device 920. An App termination request for terminating the App may be sent using an HTTP DELETE method. However, the DELETE method does not include a body message, such that a method for identifying the App to be terminated is needed. Thus, the App to be terminated is identified based on orgID and appID included in XML AIT as shown in Table 26. Table 26 shows an example of the App termination request.

TABLE 26

DELETE /apps/hbbtv?orgId=1234&appID=7890

Figure 13:
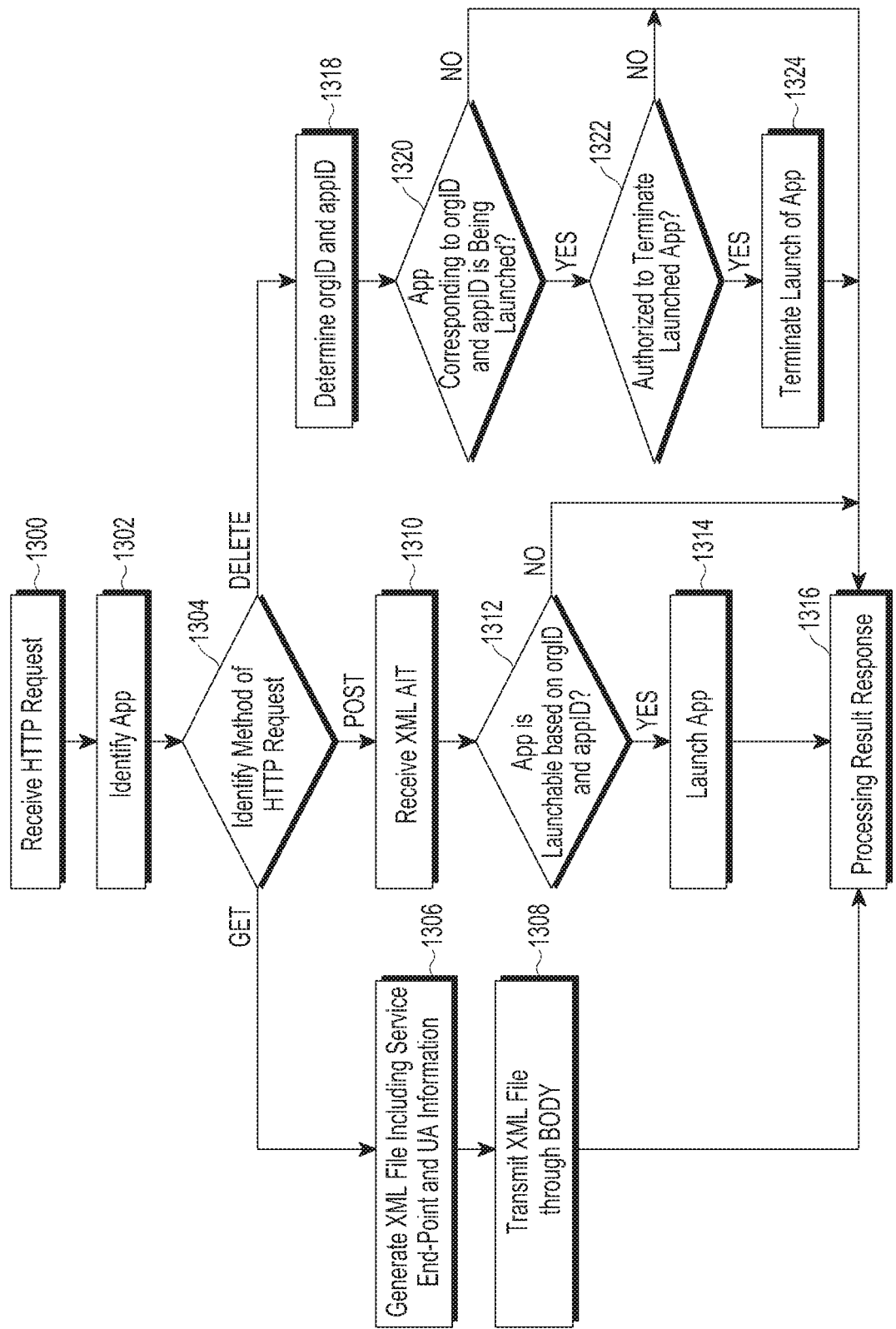
FIG. 13 is a flowchart illustrating a process of launching and terminating an App by a first device according to a third embodiment of the present disclosure.

With reference to FIG. 13, a description will be made of an operation of launching and terminating the App of the first device 910.

FIG. 13 is a flowchart illustrating a process of launching and terminating an App by a first device according to the third embodiment of the present disclosure.

Referring to FIG. 13, the first device 910 receives an HTTP request from the second device 920 in operation 1300. The first device 910 analyzes URL information included in the HTTP request to identify an App in operation 1302. The first device 910 performs the following operations if the identified App is a particular App predefined in the system.

The first device 910 identifies a method of the HTTP request in operation 1304. The first device 910 determines that the second device 920 sends a request for App information of the first device 910 if the identified method is a GET method, and generates an XML file including service end-point and UA information in operation 1306. The first device 910 transmits the generated XML file to the second device 920 through the BODY part in operation 1308. The transmission may be regarded as the same operation as a processing result response of operation 1316.

If the identified method is a POST method, the first device 910 determines that the second device 920 instructs launch of the App of the first device 910 and goes to operation 1310. The first device 910 receives XML AIT included in a BODY part of the HTTP request in operation 1310. The first device 910 then determines based on orgID and appID whether the App is launchable in operation 1312. In this case, the first device 910 may determine whether the App is launchable, based on a white list indicating a list of launchable Apps or a black list indicating a list of non-launchable Apps, the white list or black list being stored in advance in the first device 910, or based on a user input. If the App is launchable, the first device 910 launches the App in operation 1314 and transmits a processing result to the second device 920 in operation 1316. Herein, the first device 910 needs to manage appID and orgID corresponding to the App being launched.

If the identified method is the DELETE method, the first device 910 determines that the second device 920 instructs termination of the App and determines orgID and appID included in the HTTP request in operation 1318. The first device 910 determines whether the App corresponding to the determined orgID and appID is being launched in operation 1320. If the App corresponding to the determined orgID and appID is being launched, the first device 910 goes to operation 1322 to determine whether the first device 910 is authorized to terminate the launched App. If the first device 910 is authorized to terminate the App, the first device 910 terminates the App being launched in operation 1324 and transmits a result to the second device 920 in operation 1316.

Next, an overall operation related to App launch of the second device 920 will be described with reference to FIG. 14.

Figure 14:
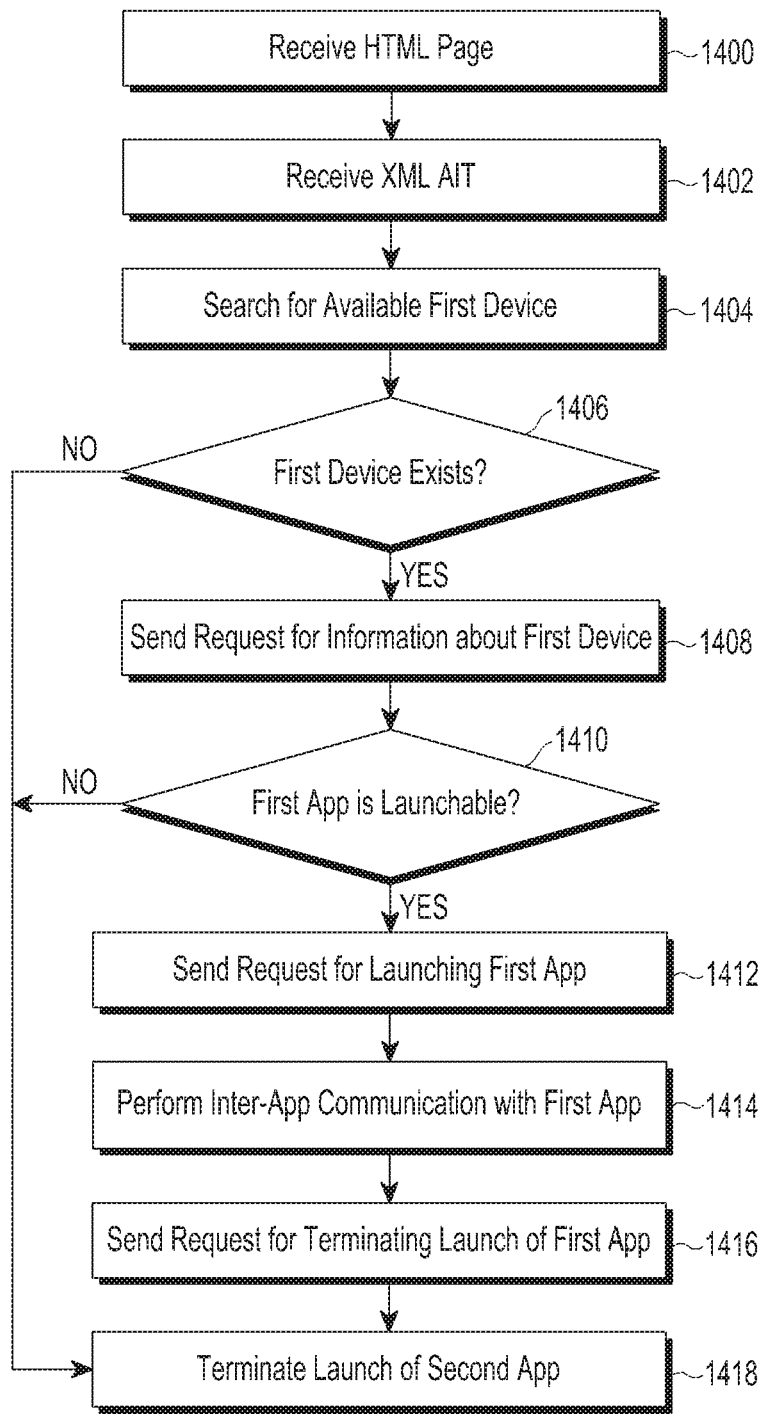
FIG. 14 is a flowchart illustrating an operation associated with launch of an App by a second device according to a third embodiment of the present disclosure.

FIG. 14 is a flowchart illustrating an operation associated with launch of an App by a second device according to a third embodiment of the present disclosure.

Referring to FIG. 14, the second device 920 receives an HTML page and launches an App (hereinafter, referred to as a 'second App') of the second device 920 in operation 1400. If the second App is a native App, the second App is launchable without receiving the HTML page.

The second device 920 receives an XML AIT including information necessary for launching g an App (hereinafter, referred to as a 'first App') of the first device 910 from the web server 900 in operation 1402. The second device 920 searches for an available device (e.g., the first device 910) through the launched second App in operation 1404.

If the first device 910 is not found in operation 1406, the second device 920 terminates launch of the second App in operation 1418. If the first device 910 is discovered, the second device 920 sends a request for information about the first device 910 by using the HTTP GET method in operation 1408. The second device 920 receives service end-point information for inter-App communication and UA information including information about capabilities of the first device 910 from the first device 910 in response to the request. The UA information may include hardware characteristics (a screen size, a central processing unit (CPU) speed, PVR support, and the like) of the first device 910, features (a multi-screen function, digital rights management (DRM) support, and the like) supported by the first device 910, and the like.

The second device 920 determines whether the first App is launchable in the first device 910 based on the UA information in operation 1410. For example, if the first device 910 has a small screen supporting a high definition (HD)-level resolution, but the first App needs a minimum of a full HD (FHD) level, then the second device 920 may determine that the first App is not launchable in the first device 910. Thus, in this case, the second device 920 goes to operation 1418 without sending a request for launching the first App to the first device 910.

Meanwhile, if determining that the first App is launchable in the first device 910, the second device 920 goes to operation 1412 to send a request for launching the first App in the first device 920 in operation 1412. To send the request for launching the first App, the HTTP POST method may be used.

The second device 920 generates a communication channel between the first device 910 and the second device 920 based on the service end-point information to perform inter-App communication in operation 1414. If launch of the first App needs to be terminated, the second device 920 sends a request for terminating launch of the first App to the first device 910 by using the HTTP DELETE method in operation 1416, and terminates launch of the second App in operation 1418.

Figure 15:
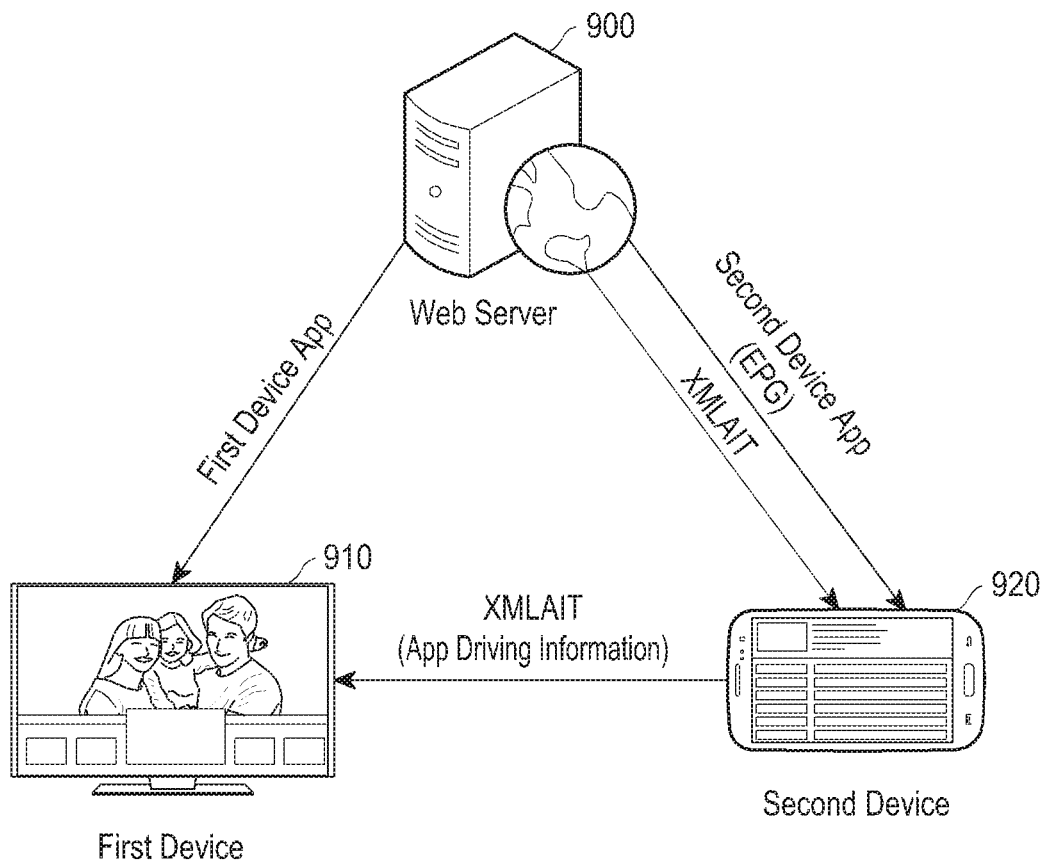
FIG. 15 illustrates an example to which a method according to a third embodiment of the present disclosure is applied.

FIG. 15 illustrates an example to which a method according to a third embodiment of the present disclosure is applied.

Referring to FIG. 15, for example, the web server 900 is a broadcasting company's web server, the first device 910 is a DTV, and the second device 920 is a mobile terminal.

A user receives an electronic program guide (EPG) from the web server 900 by using the second device 920. The user selects a desired broadcasting program based on the EPG and desires to watch the selected broadcasting program through the first device 910.

As stated above, once the user selects the desired broadcasting program, the second device 920 searches for the first device 910 that is available in a home network. If the first device 910 is found, the second device 920 transmits XML AIT information received from the web server 900 to the first device 910. The first device 910 then launches a corresponding App based on the XML AIT information and shows the broadcasting program selected in the second device 920 to the user.

Meanwhile, embodiments proposed in the present disclosure have been described with three embodiments, but the three embodiments may be variously modified and used, for example, by combining at least two of the three embodiments.

Particular aspects of the present disclosure may also be implemented as a computer readable code in a computer readable recording medium. The computer readable recording medium may be any type of data storage device that may store data readable by a computer system. Examples of record-mediums readable by the computer may include a read-only memory (ROM), a random-access memory (RAM), a compact disc-ROM (CD-ROM), magnetic tapes, floppy disks, optical data storage devices, carrier waves (such as data transmission through the Internet). The computer-readable recording medium may be distributed over network-connected computer systems, and thus the computer-readable code is stored and executed in a decentralized fashion. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a ROM, a memory such as a RAM, a memory chip, a device, or an integrated circuit; and an optically or magnetically recordable and machine (e.g., computer)-readable storage medium such as a CD, a digital versatile discDVD, a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset contents protection method, information necessary for the contents protection method, a communication unit for performing wired or wireless communication with the graphic processing apparatus, and a controller for transmitting a corresponding program to the transceiver at the request of the graphic processing apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A first device for communicating with a second device in a communication system, the first device comprising:
a transceiver; and
at least one processor configured to:
discover the second device by a first application launched in the first device,
control the transceiver to:
upon discovering the second device, transmit, to the second device, an information request for requesting information about the second device,
receive, from the second device, first uniform resource locator (URL) information for a hypertext transfer protocol (HTTP) server included in the second device, in response to the information request, the first URL information being URL information of a second application of the second device,
receive, from the second device, second URL information for a web socket server in the second device, the second URL information being used for communication between the first application connected to the web socket server and the second application connected to the web socket server,
determine to obtain service information of the second device through one of the web socket server and an HTTP request,
in response to a determination to obtain the service information through the web socket server:
establish connection with the web socket server based on the obtained second URL information,
control the transceiver to transmit a request for the service information through the established connection, and
control the transceiver to receive the service information in response to the request, and
in response to a determination to obtain the service information through the HTTP request:
control the transceiver to transmit, to the HTTP server included in the second device, the HTTP request for requesting the service information based on the obtained first URL information,
control the transceiver to receive, from the HTTP server, an HTTP response including the service information,
obtain user agent information from the service information obtained through one of the web socket server and the HTTP request,
identify capability information of the second device included in the user agent information, the capability information including screen size information of the second device and information about a multi-screen function supported by the second device,
determine whether the second application is launchable in the second device based on the capability information, and
control the transceiver to transmit, to the second device, a launch request to launch the second application in response to determination that the second application is launchable in the second device.

2. The first device of claim 1, wherein the at least one processor is further configured to control the transceiver to:
transmit a device discovery request,
receive, from the second device, a device discovery response including a third URL information for universal plug and play (UPnP) description,
transmit, to the second device, a device description request for requesting the information about the second device based on the third URL information, and
receive, from the second device, a device description response including the first URL information.

3. The first device of claim 2, wherein the third URL information is obtained from a location header in the device discovery response.

4. The first device of claim 1, wherein the at least one processor is further configured to:
obtain, from the second device, fourth URL information for synchronization between the first device and the second device.

* * * * *